(12) United States Patent
Haftbaradaran et al.

(10) Patent No.: US 12,695,541 B2
(45) Date of Patent: Jul. 28, 2026

(54) NON-BINARY GF(Q) POLAR SUCCESSIVE CANCELLATION DECODER AND FAST DECODING OF SPECIAL NODES

(71) Applicant: QUALCOMM Incorporated, San Diego, CA (US)

(72) Inventors: Afshin Haftbaradaran, San Diego, CA (US); Alessandro Risso, San Diego, CA (US); Shravan Kumar Reddy Garlapati, San Diego, CA (US); Li Zhang, San Diego, CA (US); Wei Yang, San Diego, CA (US); Kirill Ivanov, La Jolla, CA (US); Jing Jiang, San Diego, CA (US); Seyyed Ali Hashemi, San Jose, CA (US); Hobin Kim, San Diego, CA (US); Hari Sankar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 303 days.

(21) Appl. No.: 18/611,590

(22) Filed: Mar. 20, 2024

(65) Prior Publication Data

US 2025/0300765 A1 Sep. 25, 2025

(51) Int. Cl.
*H04L 1/00* (2006.01)
*H04L 1/20* (2006.01)

(52) U.S. Cl.
CPC .............. *H04L 1/0054* (2013.01); *H04L 1/20* (2013.01)

(58) Field of Classification Search
None
See application file for complete search history.

(56) References Cited

U.S. PATENT DOCUMENTS

2020/0127680 A1* 4/2020 Kim ...................... H03M 13/13
2023/0412197 A1* 12/2023 Berman ............... G05D 1/0217

OTHER PUBLICATIONS

3GPP TS 38.212: "3rd Generation Partnership Project, Technical Specification Group Radio Access Network, NR, Multiplexing and Channel Coding (Release 18)", 3GPP TS 38.212, V18.1.0, Dec. 2023, pp. 1-293.
Abbasi F., et al., "Hybrid Non-Binary Repeated Polar Codes For Low-SNR Regime", 2021 IEEE International Symposium on Information Theory (ISIT), Melbourne, Australia, Jul. 12-Jul. 20, 2021, 6 Pages.
Arikan E., "Channel Polarization: A Method for Constructing Capacity-Achieving Codes for Symmetric Binary-Input Memoryless Channels", IEEE Transactions on Information Theory, IEEE Press, USA, vol. 55, No. 7, Jul. 24, 2008, pp. 1-23, XP080428257, Jul. 20, 2009, ISSN: 0018-9448.
Balatsoukas-Stimming A., et al., "Hardware Architecture for List Successive Cancellation Decoding of Polar Codes", IEEE Transactions on Circuits and Systems II: Express Briefs, vol. 61, No. 8, Aug. 2014, XP011555559, pp. 609-613.

(Continued)

*Primary Examiner* — Kouroush Mohebbi
(74) *Attorney, Agent, or Firm* — Procopio, Cory, Hargreaves & Savitch

(57) ABSTRACT

A receiver receives a wireless transmission and decodes the wireless transmission based on a non-binary polar successive cancellation list (SCL) decoder algorithm in which a path metric (PM) computation uses a maximum approximation based on logarithmic normalized values for random variable probabilities.

20 Claims, 14 Drawing Sheets

(56) References Cited

OTHER PUBLICATIONS

Byun S.C., et al., "A Construction of Non-binary Polar Codes with 4 by 4 Kernels", 2019 Ninth International Workshop on Signal Design and its Applications in Communications (IWSDA), Dongguan, China, Oct. 20-Oct. 24, 2019, 5 Pages.

Chen K., et al., "Improved Successive Cancellation Decoding of Polar Codes", IEEE Transactions on Communications, vol. 61, No. 8, pp. 3100-3107, Aug. 2013.

Cochachin F., et al., "Reduced Complexity of a Successive Cancellation Based Decoder for NB-Polar Codes", 2021 11th International Symposium on Topics in Coding (ISTC), Montreal, QC, Canada, Aug. 30-Sep. 3, 2021, 5 Pages.

Farsiabi A., et al., "Fast Successive-Cancellation Decoding of 2 × 2 Kernel Non-Binary Polar Codes: Identification, Decoding and Simplification", arXiv:2401.07433v1 [cs.IT], Jan. 15, 2024, pp. 1-13.

Feng B., et al., "Simplified Successive-Cancellation List Decoding of Non-Binary Polar Codes with Rate-1 Node", 2020 IEEE Wireless Communications and Networking Conference (WCNC), Seoul, Korea (South), May 25-May 28, 2020, 6 Pages.

Hashemi S.A., et al., "Fast Simplified Successive-Cancellation List Decoding of Polar Codes", 2017 IEEE Wireless Communications and Networking Conference Workshops (WCNCW), IEEE, Mar. 19-22, 2017, pp. 1-6, XP033093164, section II.

Jabour J., et al., "Asymmetrical Extended Min-Sum for Successive Cancellation Decoding of Non-Binary Polar Codes", 2023 12th International Symposium on Topics in Coding (ISTC), Brest, France, Sep. 2023, 6 Pages.

Li S., et al., "An Ultra-Reliable Low-Latency Non-Binary Polar Coded SCMA Scheme", IEEE Transactions on Vehicular Technology, vol. 71, No. 6, Jun. 2022, pp. 1-16.

Li S., et al., "Research on Encoding and Decoding of Non-binary Polar Codes over GF(2m)", Digital Communications and Networks, vol. 8, No. 3, Jun. 2022, pp. 359-372.

Mori R., et al., "Non-Binary Polar Codes using Reed-Solomon Codes and Algebraic Geometry Codes", 2010 IEEE Information Theory Workshop, Dublin, Ireland, Aug.-Sep. 3, 2010, 5 Pages.

Savin V., "Non-Binary Polar Codes for Spread-Spectrum Modulations", 2021 11th International Symposium on Topics in Coding (ISTC), Montreal, QC, Canada, Aug. 30-Sep. 3, 2021, 5 Pages.

Tal I., et al., "List Decoding of Polar Codes", 2011 International Symposium on Information Theory proceedings, St. Petersburg, Russia, Jul. 31-Aug. 5, 2011, pp. 1-11, May 31, 2012, XP055225954, Piscataway, NJ, sections II-III.

Tao Y., et al., "High-Throughput Split-Tree Architecture for Nonbinary SCL Polar Decoder", 2022 IEEE International Symposium on Circuits and Systems (ISCAS), Austin, TX, USA, May 27-Jun. 1, 2022, 5 Pages.

Yuan P., et al., "Construction and Decoding Algorithms for Polar Codes based on 2×2 Non-Binary Kernels", 2018 IEEE 10th International Symposium on Turbo Codes Iterative Information Processing (ISTC), Hong Kong, China, Dec. 3-Dec. 7, 2018, 5 Pages.

* cited by examiner

1200

1202

Receive a wireless transmission

1204

Decode the wireless transmission based on a non-binary Polar SCL decoder algorithm in which a path metric (PM) computation uses a maximum approximation based on logarithmic normalized values for random variable probabilities

NON-BINARY GF(Q) POLAR SUCCESSIVE CANCELLATION DECODER AND FAST DECODING OF SPECIAL NODES

TECHNICAL FIELD

The present disclosure relates generally to communication systems, and more particularly, to wireless communication that includes polar encoding.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus includes at least one memory and at least one processor coupled to the at least one memory. Based at least in part on information stored in the at least one memory, the at least one processor, individually or in any combination, is configured to receive a wireless transmission and decode the wireless transmission based on a non-binary polar successive cancellation list (SCL) decoder algorithm in which a path metric (PM) computation uses a maximum approximation based on logarithmic normalized values for random variable probabilities.

To the accomplishment of the foregoing and related ends, the one or more aspects may include the features hereinafter fully described and particularly pointed out in the claims. The following description and the drawings set forth in detail certain illustrative features of the one or more aspects. These features are indicative, however, of but a few of the various ways in which the principles of various aspects may be employed.

DETAILED DESCRIPTION

Figure 1:
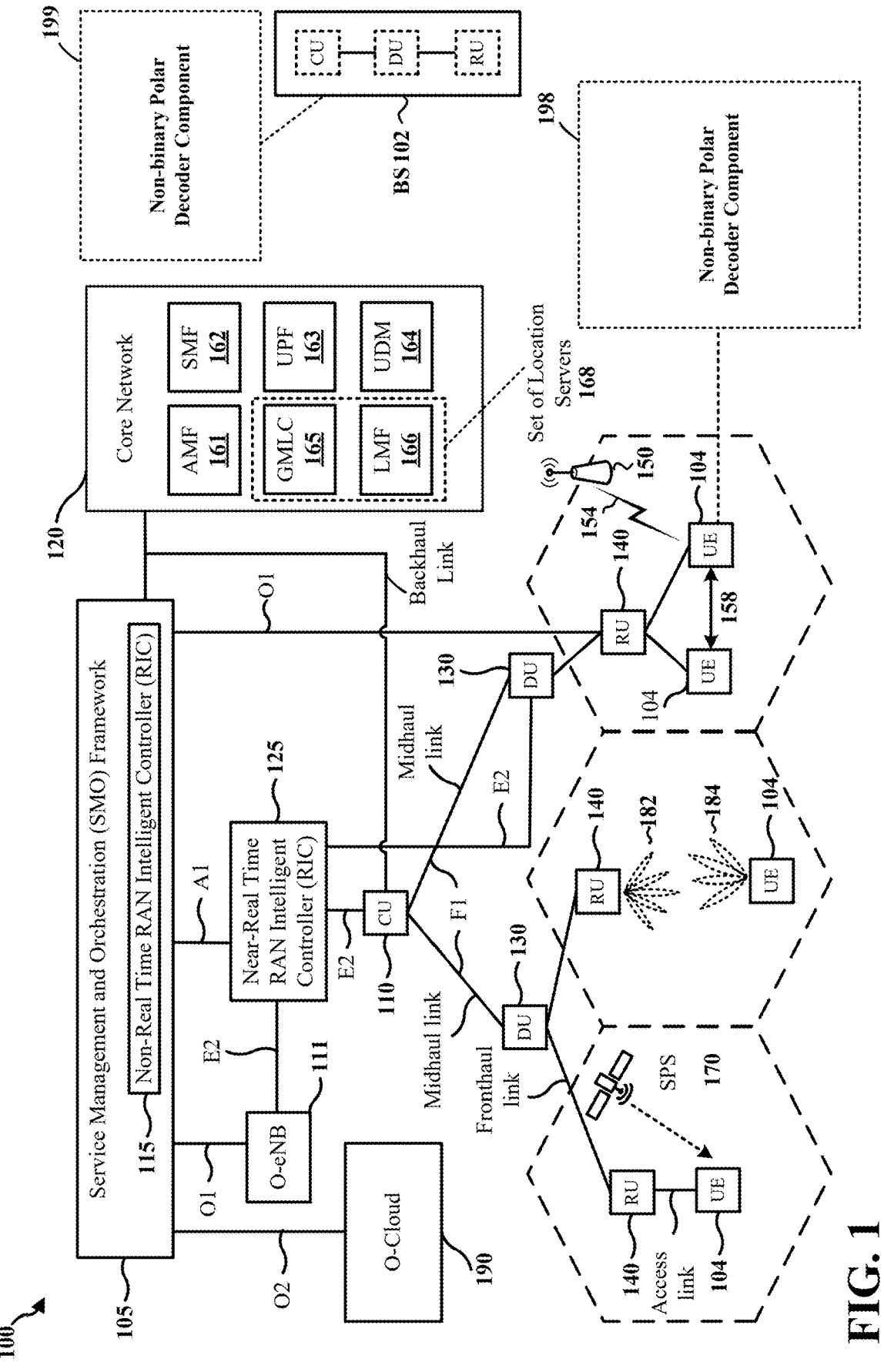
FIG. 1 is a diagram illustrating an example of a wireless communications system and an access network, in accordance with various aspects of the present disclosure.

Non-binary Polar encoding enables the encoding of sequence of symbol in which each symbol carries multiple bits of information, e.g., in contrast to binary Polar encoding of a sequence of bits, in which the granularity is for single bits of information. The non-binary Polar encoding enables the representation of more information, yet leads to significant decoder complexity at a receiver. Various aspects presented herein enable a reduction in the complexity of non-binary Polar decoding algorithms. Some aspects presented herein relate generally to non-binary Polar decoding based on a successive cancellation list algorithm in which a path metric computation uses a maximum approximation for probabilities of random variable probabilities. For example, the maximum approximation of the random variable probabilities may be based on logarithmic normalized probability values. The use of the maximum approximation and/or the logarithmic normalization enables a reduction in complexity at the receiver, e.g., enabling the use of less complex and more cost efficient receiver hardware.

Some aspects more specifically relate to non-binary Polar successive cancellation list (SCL) decoder algorithm using a maximum approximation for Galois field elements GF(q) in which q is an integer number representing a number of elements, e.g., $q=2^N$, where N is an integer number. In some aspects, the decoding may be based on various characteristics of a Rate-0 node, a Rate-1 node, a weighted repetition (WREP) node, and/or a single parity check (SPC) node. A Rate-0 parent node has child node values that correspond to known symbols. A Rate-1 parent node has child node values that correspond to information symbols. An WREP parent node has child nodes corresponding to known symbols except for a single node corresponding to an information symbol. For an SPC parent node, a child node value corresponds to a known symbol and other child node values correspond to information symbols. In some aspects, a split may be performed for one or more less reliable node, which may be identified based on entropy. Hard decisions may be performed for the other child node values of a parent node (e.g., other than the less reliable node(s)) and a corresponding computation of a path metric at a parent node.

Particular aspects of the subject matter described in this disclosure can be implemented to realize one or more of the following potential advantages. In some examples, by reducing the processing at the receiver to perform non-binary Polar decoding of encoded wireless transmissions, the described techniques can be used to reduce hardware complexity and/or costs for wireless communication devices.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. When multiple processors are implemented, the multiple processors may perform the functions individually or in combination. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUS)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUS 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (IFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via 01) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base station 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Some UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth™ (Bluetooth is a trademark of the Bluetooth Special Interest Group (SIG)), Wi-Fi™ (Wi-Fi is a trademark of the Wi-Fi Alliance) based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHZ-7.125 GHZ) and FR2 (24.25 GHz-52.6 GHZ). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHZ-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHZ-71 GHZ), FR4 (71 GHz-114.25 GHZ), and FR5 (114.25 GHZ-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may have a non-binary Polar decoder component 198 that is configured to receive a wireless transmission and decode the wireless transmission based on a non-binary polar successive cancellation list (SCL) decoder algorithm in which a path metric (PM) computation uses a maximum approximation based on logarithmic normalized values for random variable probabilities. In certain aspects, the base station 102 may have a non-binary Polar decoder component 199 that may be configured to that is configured to receive a wireless transmission and decode the wireless transmission based on a non-binary polar SCL decoder algorithm in which a PM computation uses a maximum approximation based on logarithmic normalized values for random variable probabilities.

Figure 2:
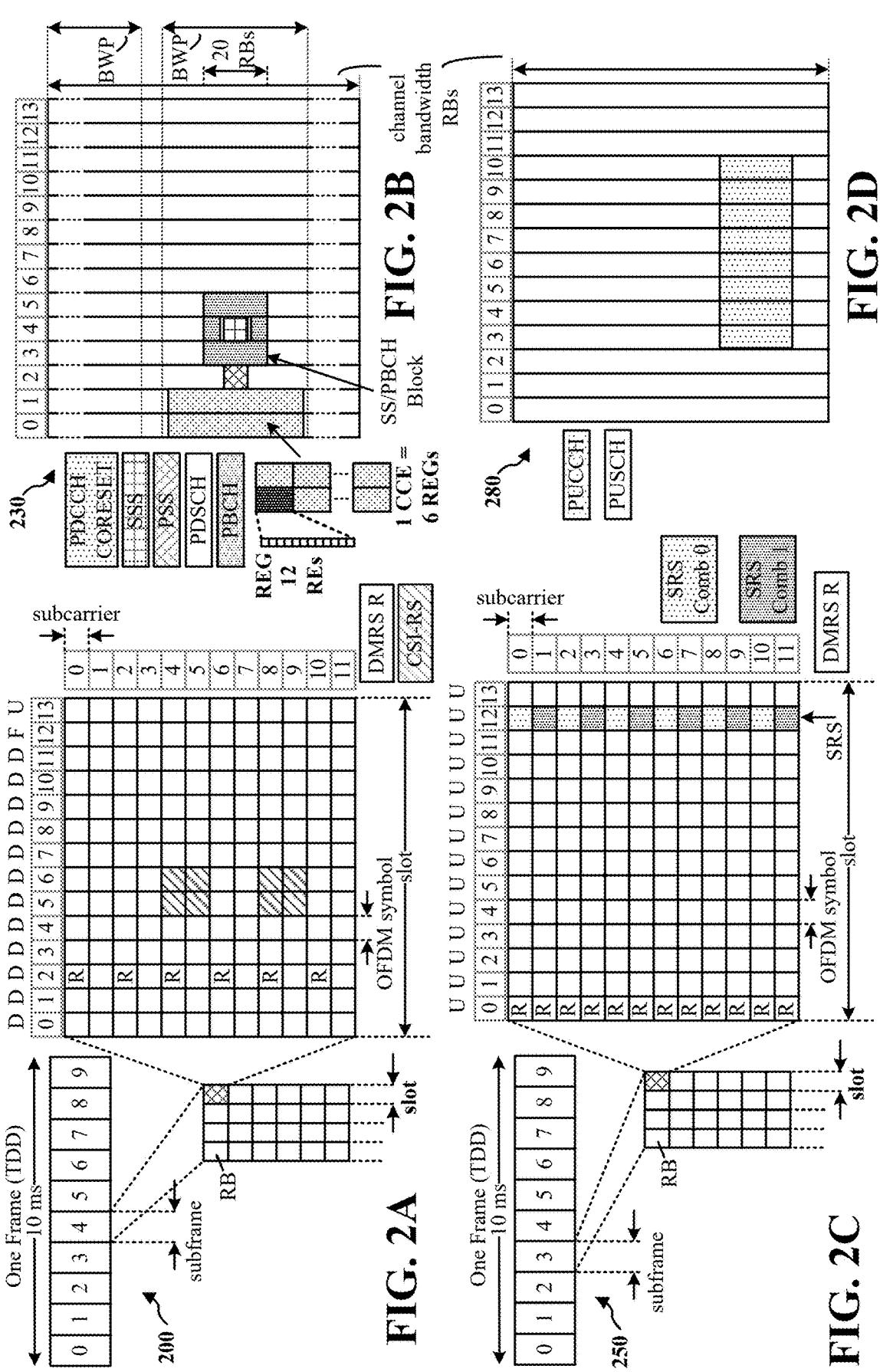
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

| Numerology, SCS, and CP | | |
| --- | --- | --- |
| $\mu$ | SCS $\Delta f = 2^{\mu} \cdot 15$ [kHz] | Cyclic prefix |
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^{\mu}$ slots/subframe. The subcarrier spacing may be equal to $2^{\mu}*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
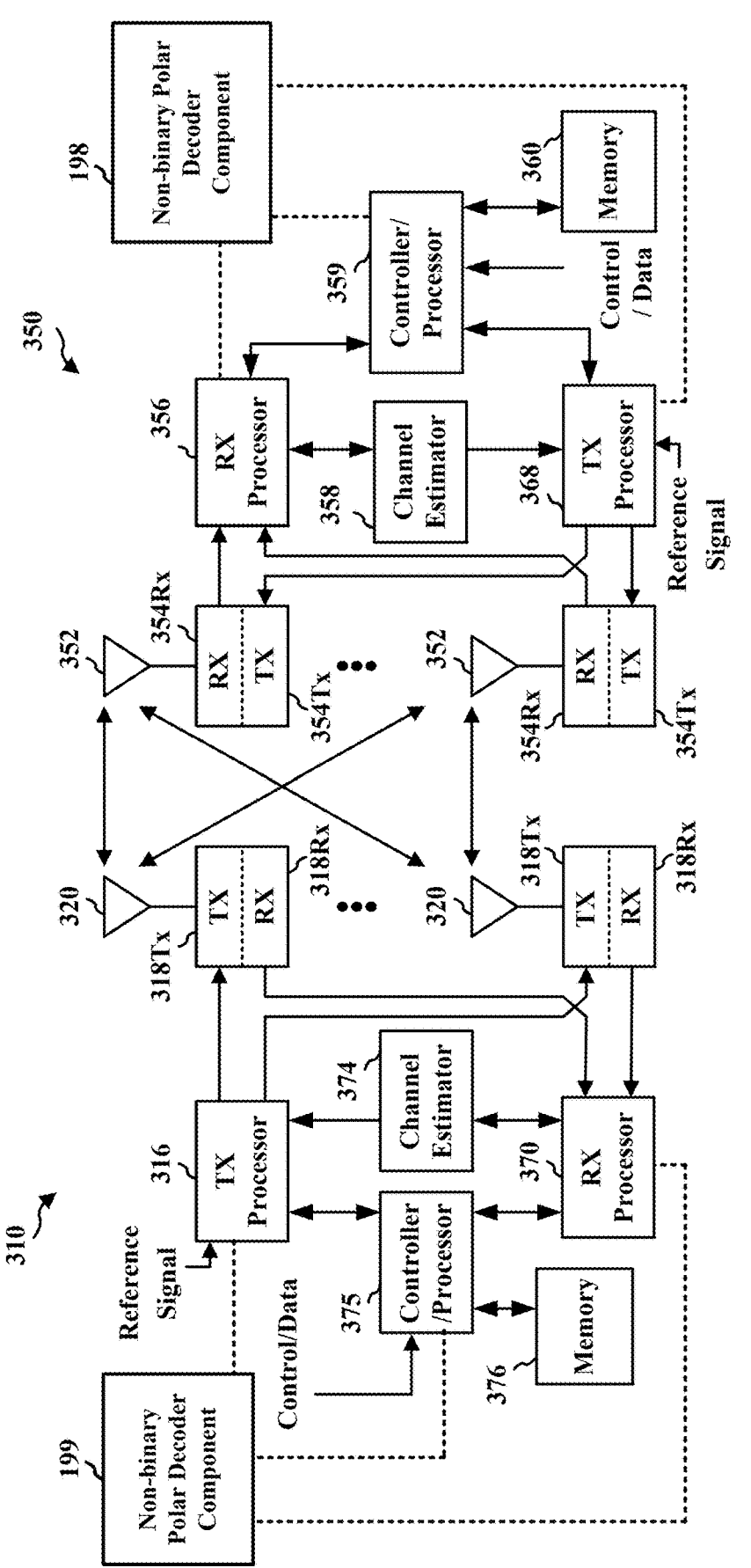
FIG. 3 is a diagram illustrating an example of a base station and user equipment (UE) in an access network, in accordance with various aspects of the present disclosure.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with at least one memory 360 that stores program codes and data. The at least one memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with at least one memory 376 that stores program codes and data. The at least one memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the non-binary Polar decoder component 198 of FIG. 1.

At least one of the TX processor 316, the RX processor 370, and the controller/processor 375 may be configured to perform aspects in connection with the non-binary Polar decoder component 199 of FIG. 1.

Wireless communication may be encoded by a transmitter using a polar code, and a receiver may receive the wireless signal and decode the received transmission using a corresponding polar decoder to obtain the information carried in the wireless signal. For example, the transmitter uses a Polar coding algorithm to encode a series of bits that it has for transmission. Then, on the receiver side, the decoder uses a corresponding algorithm to decode the received bits. Polar codes include the channel codes which can achieve channel capacity when the code length approaches infinity. In binary versions of Polar codes, individual bits are processed in the channel coding and decoding process. Thus, the term "binary" indicates that the granularity of the encoded information corresponding to a single bit. As an example, binary polar code may be used to transmit a physical layer control channel (PDCCH) transmission, among other examples.

Figure 4:
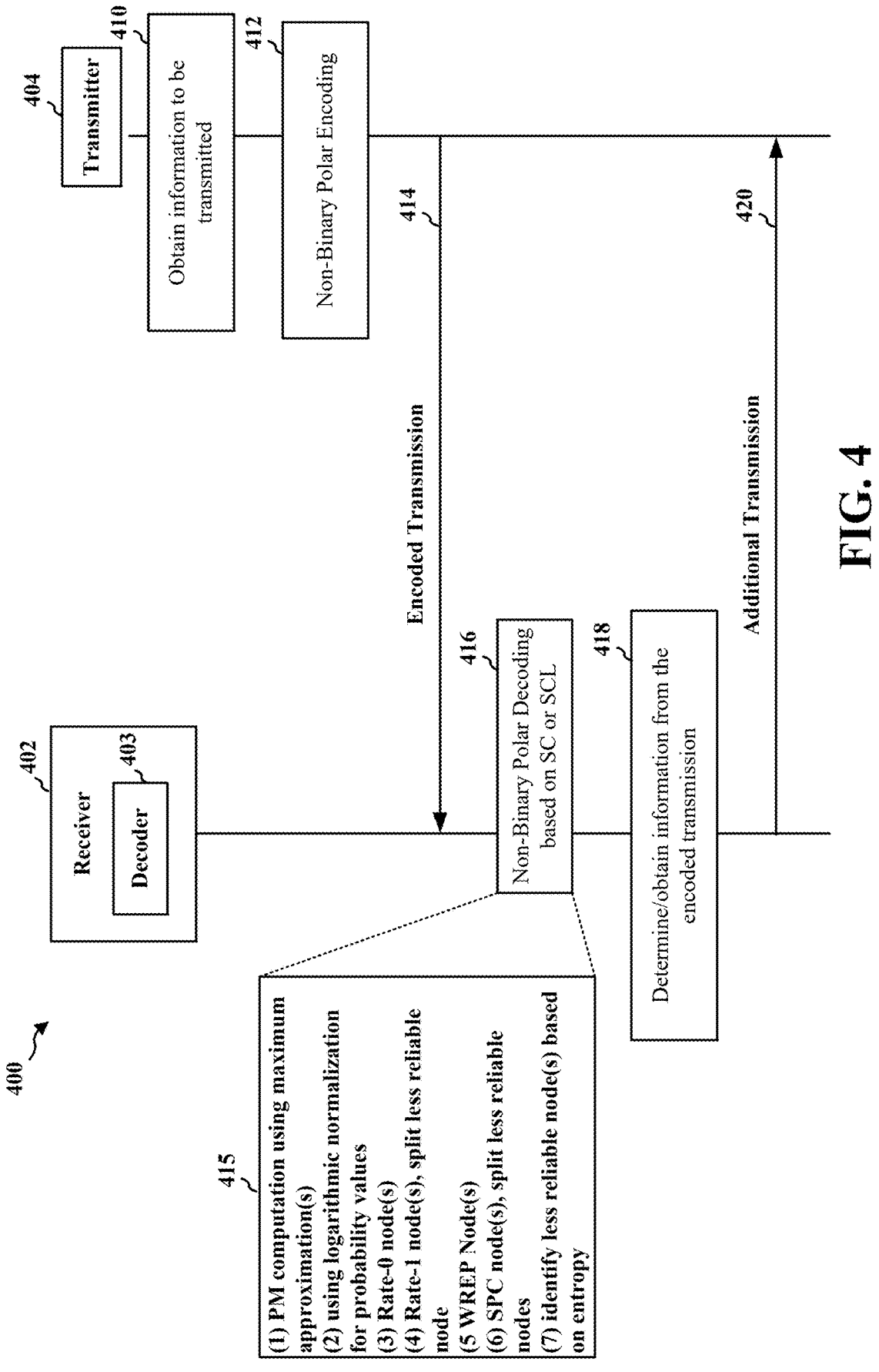
FIG. 4 illustrates an example communication flow between a wireless transmitter and receiver including Polar coding and decoding, in accordance with various aspects of the present disclosure.

FIG. 4 illustrates an example communication flow 400 in which a transmitter 404 obtains information to be transmitted, at 410, and encodes a transmission based on Polar encoding, at 412. The transmitter 404 then transmits the encoded transmission 414. In some examples, the encoded transmission may include a PDCCH transmission or a PUCCH transmission. In some aspects, other types of transmissions may be encoded, such as a PUSCH transmission, a PSCCH transmission, or a PSSCH transmission, among other example transmissions. A receiver 402 receives the encoded transmission 414 and uses a corresponding Polar decoding 416 to obtain the information carried in the encoded transmission 414, at 418. The receiver 402 may similarly transmit a transmission 420 to the transmitter, such as an acknowledgement that the encoded transmission was received accurately, or other communication. As an example, the transmitter 404 may correspond to a base station (e.g., 102, 310) or one or more components of a base station, and the receiver 402 may correspond to a UE (e.g., 104, 350). In other examples, the transmitter 404 may be a UE, and the receiver 402 may be a base station or another UE.

In some aspects, the receiver 402 may use a Polar successive cancellation (SC) decoder, at 416, which uses an algorithm to decode the bits at the receiver 402, which were originally encoded at the transmitter 404 using Polar codes. In SC decoding, each bit of the information may be decoded successively. In some aspects, the receiver 402 may use a Polar successive cancellation list (SCL) algorithm, at 416, e.g., to improve the error-correction performance of Polar SC decoder. The present application provides various aspects of non-binary Polar decoding based on SC or SCL that can be used to reduce the complexity of the decoder processing and enable the use of less complex hardware at the receiver 402. Some example aspects that may be used in connection with the decoding are shown at 415, and are described in further detail herein.

Figure 5:
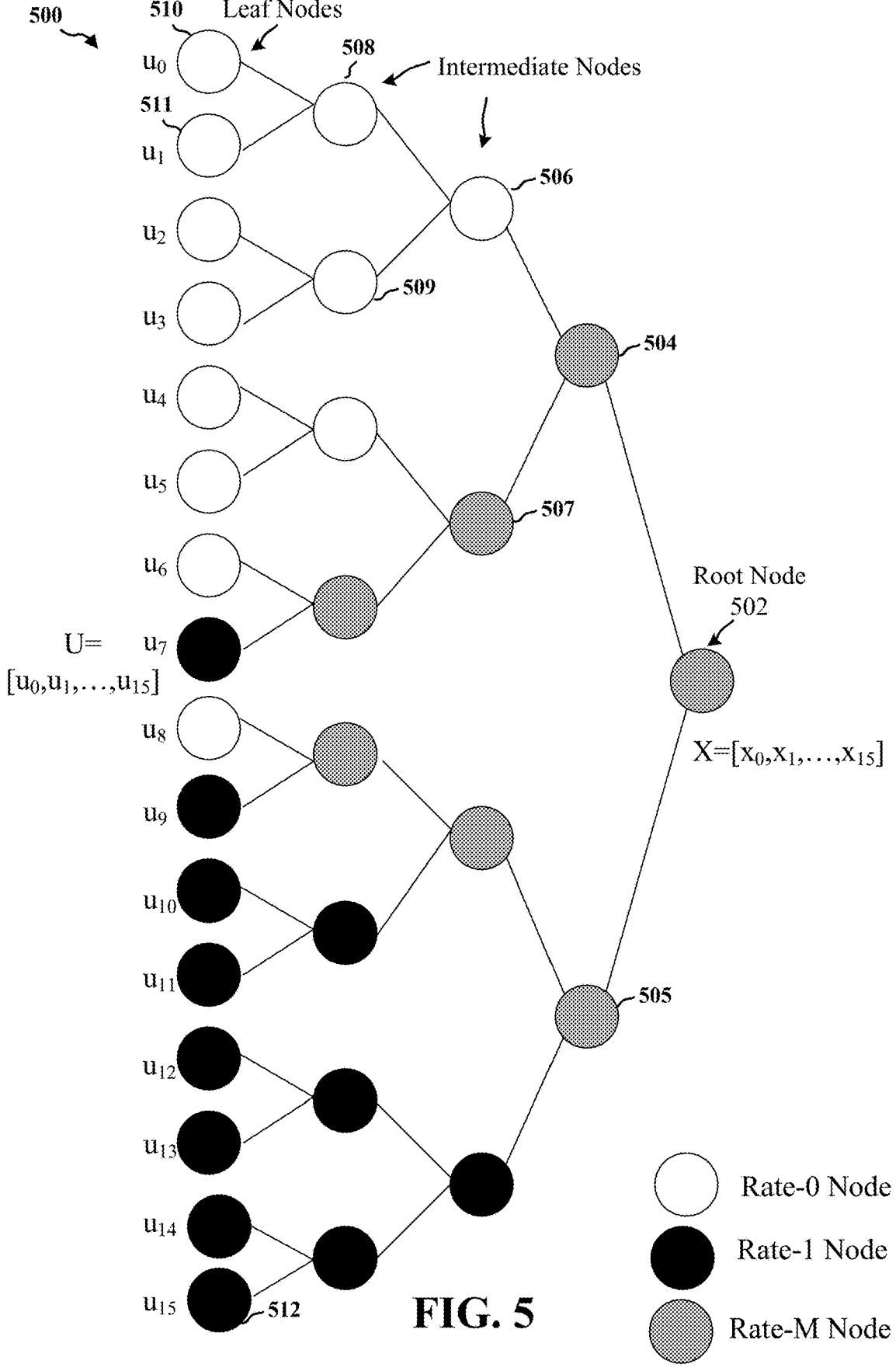
FIG. 5 illustrates an example tree traversal representation for non-binary Polar SC and SCL decoding, in accordance with various aspects of the present disclosure.

The Polar SC and SCL decoder algorithms employed at 416 can be represented as a tree traversal algorithm. For binary Polar SC and SCL decoding, each leaf represents one bit. Non-binary Polar SC and SCL decoder algorithms can also be represented as a tree traversal algorithm, similar to the binary Polar SC/SCL algorithms. However, for non-binary Polar SC and SCL decoding, each leaf can represent multiple bits. FIG. 5 illustrates an example tree traversal representation 500 for non-binary Polar SC and SCL decoding. The root node 502 represents the information that is received from the wireless channel, e.g., which may be received, or presented, as a logarithmic likelihood ratio (LLR). For example, the soft metrics associated with each received bit, e.g. a LLR, may be provided at the root node 502 and then traversed using "f" and "g" functions to the leaf nodes in a specific order from the first bit(s) on the top (e.g., to obtain the information at the first leaf 510) to the last bit(s) on the bottom (e.g., to obtain the information at the bottom leaf 512). The f function and the g function are different for binary Polar decoding and non-binary Polar decoding.

For successive decoding, the traversal proceeds descending from the root node 502 toward the first leaf (e.g., 510) using a first function, which may be referred to as an "f" function. Once the information for the first leaf (at 510) is obtained based on the channel information that was received, the decoding process moves back a level and uses a function, which may be referred to as a "g" function, to obtain information in another leaf (e.g., 511). The decoding process continues successively until the information is obtained for the bottom leaf (e.g., 512).

Each decoded symbol can be represented as a leaf node (or leaf) (e.g., as shown at 510, 511, and 512). The intermediate levels may also be referred to as nodes. Nodes 504, 506, and 508 are examples of intermediate nodes at different depths in the tree traversal representation 500. The code length of a parent node (e.g., 502) is based on the number of child leaf nodes that it includes. In the example in FIG. 5, there are 16 leaf nodes (e.g., $u_0$, $u_1$, $u_2$, $u_3$, $u_4$, $u_5$, $u_6$, $u_7$, $u_8$, $u_9$, $u_{10}$, $u_{11}$, $u_{12}$, $u_{13}$, $u_{14}$, and $u_{15}$), and the length of the parent node would be a code length of 16 based on the 16 leaf nodes (e.g., $X=[x_0, x_1, x_2, x_3, x_4, x_5, x_6, x_7, x_8, x_9, x_{10}, x_{11}, x_{12}, x_{13}, x_{14}, x_{15}]$). In binary polar coding, each leaf node represents a single bit, and in non-binary polar coding, each leaf node represents multiple bits. The root node and each parent node have two child nodes, one on the top and one on the bottom. For example, the root node 502 has two child nodes (e.g., 504 and 505), which each have two child nodes. For example, the node 504 has two child nodes (e.g., 506 and 507), each of which also has two child nodes. For example, node 506 has two child nodes (e.g., 508 and 509), which similarly have two child nodes (e.g., leaf nodes $u_0$ and $u_1$ for node 508 and leaf nodes $u_2$ and $u_3$ for node 509).

The decoding processing steps are proportional to the size of the tree, and the size of the tree depends on a code length. In a Polar SC decoder, the processing steps for the bit(s) at each leaf node concludes with a "hard decision" when the tree is traversed to the corresponding leaf. In Polar SCL decoder, a hard decision is not made when reaching the leaf, and instead, multiple possibilities are maintained along with a cumulative metric known as path metric (PM). For example, for a binary Polar SC decoder, at a leaf, the decoder would make a decision as to whether the bit is a "0" or a "1." For a binary Polar SCL decoder, a decision is not made as to whether the bit is a "0" or a "1," and instead an evaluation metric is assessed. Based on the evaluation metric, some of the possibilities for a sequence of decoded bits may be discarded. For example, with SCL decoding, a list of possibilities for bit values is maintained, and can be reduced based on the evaluation metric.

Multiple combinations of the decisions at the leaf nodes result in multiple hypothesis sequences of received bits, which may be referred to as lists. After the tree traversal finishes, the best list can be chosen according to the best PM. As an example, $2^N$ (in which N is the code length) lists can be considered. However, the hardware complexity grows proportional to the number of the lists. As a tradeoff between hardware complexity and the error correction performance, the number of lists (which may be referred to as a list size) may be limited and the decoder may prune the list of possibilities along the way as the tree traversal algorithm processes each leaf. As an example, the list size may be limited to a threshold limit, and the possible lists may be pruned to meet the limit as each leaf is processed. As an example, if the threshold limit is 8, the list of possibilities (e.g., possible sequences of bits) may be pruned to maintain a list of no more than 8.

The decoder tree is traversed from root (e.g., 502) to intermediate nodes and to leaf nodes (e.g., $u_0$-$u_{15}$) and from the top leaf (e.g., $u_0$) to the bottom leaf (e.g., $u_{15}$) in a recursive manner. The top child node is traversed before the bottom child node (e.g., node 508 before node 509, node 506 before node 507, and node 504 before node 505). In the example shown in FIG. 5, some of the nodes are associated with known bits (e.g., represented as Rate-0 nodes), some of the nodes are associated with unknown bits (e.g., represented as Rate-1 nodes), and some of the nodes are associated with both known bits and unknown bits (e.g., represented as Rate-M nodes). A Rate-0 node is a node for which each leaf node corresponds to known bits, which may also be referred to as frozen bits. A Rate-1 nodes is a node for which each leaf node corresponds to information bits (e.g., which are not known). A Rate-M node may represent a node for which one or more leaf nodes correspond to known bits and one or more leaf nodes correspond to information bits (e.g., unknown bits).

The traversal of the tree algorithm to obtain the information bits in non-binary Polar SC or SCL decoding can be a time consuming process and can involve significant hardware complexity for the decoder. Aspects presented herein provide for non-binary Polar SC or SCL decoding, e.g., as shown at 416, that can be performed more quickly and with reduced hardware complexity.

Some of the intermediate nodes may have certain properties that can be identified and used to reduce the decoding process time by skipping traversal of a sub-tree under such nodes. Such nodes may be referred to as "special nodes." Examples of special nodes may include, among other examples, Rate-0 nodes, Rate-1 nodes, Weighted Repetition (WREP) nodes, and Single Parity Check (SPC) nodes. For example, a WREP node is a parent (or root) node that includes child leaf nodes that are frozen (or known) symbols except for a bottom leaf node, which is an information symbol. As another example, an SPC node has leaf nodes that are information symbols except for a top leaf node that is a frozen (e.g. zero) symbol. When traversing a SC or SCL tree algorithm as a part of non-binary Polar decoding, at some types of nodes, the processing may be simplified or skipped based on known properties about the node, as presented herein.

The non-binary Polar codes may be referred to as q-ary Polar codes, and can improve error correction performance even for moderate code length. Non-binary Polar encoding and decoding may be used for cellular digital communication (such as 6G, among other possible examples). In non-binary Polar codes, group of bits (e.g., the elements of Galois Field GF($2^n$=q)), may be considered as the transmission atomic elements (e.g., the transmitted or the received symbols). In contrast, binary Polar codes are based on a single bit rather than groups of bits as the transmission element.

A non-binary Polar SC or SCL decoder, with similar algorithms as the binary counterpart, can be used at the receiver to decode the received symbols. However, the non-binary Polar SC or SCL decoders are more complex than their binary counterparts.

As part of the decoding process, soft metrics are propagated through the tree (e.g., as illustrated in FIG. 5) using the traversal algorithms. The soft metrics correspond to symbol probabilities (e.g., Probability Mass Functions=PMFs), or other versions of the symbol probabilities (such as the logarithmic version of probabilities, as presented herein). A symbol probability is a probability that a symbol has a particular value based on transmission received at the receiver 402.

A Polar SC or SCL decoder with a 2×2 Polar kernel, which uses PMFs as a soft metric and which uses fast Hadamard transform to implement the "f" and "g" function may involve complex hardware.

As presented herein, a non-binary Polar SC or SCL decoder may use a Polar kernel, such as a 2×2 Polar kernel matrix of $$\begin{bmatrix} a & 0 \\ c & b \end{bmatrix}$$

and can use a logarithmic normalized version of probability values to provide a more hardware-friendly algorithm, e.g., an algorithm that allows for a reduction in hardware complexity. For example, the use of the logarithmic normalized version of probability values (e.g., as shown at 415 as a part of the decoding at 416) may enable an SCL decoder to decode a transmission that is encoded with non-binary polar encoding with reduced processing complexity, which enables the use of less complex or less expensive hardware components. As shown at 415, examples are also described showing the theoretical basis and the algorithms that accelerate the decoding operations of various examples of special nodes, e.g., Rate-0, Rate-1, Weighted Repetition (WREP), and Single Parity Check (SPC) nodes, in the non-binary Polar SC and SCL decoders presented herein.

As an example, for a Polar encoding algorithm based on a 2×2 generic Polar Kernel matrix (G) of $$\begin{bmatrix} a & 0 \\ c & b \end{bmatrix},$$

the encoding algorithm can be represented using the equation:

$$X=U \otimes (G^{*N})$$

In the encoding algorithm equation, X represents an array of encoded Galois GF(q) symbols, (e.g., a Galois Field (GF) in which q is an integer number representing a number of elements). For example, X represents the encoded output, U represents an array of input GF(q) symbols (e.g., the symbols input into the encoder), G corresponds to the Polar kernel matrix of $$\begin{bmatrix} a & 0 \\ c & b \end{bmatrix},$$

the indication "*" in the equation indicates Kronecker multiplication, and N represents the code length. For example, the Polar kernel matrix is multiplied (using Kronecker multiplication) by a certain order based on the number of input symbols to be encoded. "Symbol" may be used to refer to a set of bits to be encoded as an encoded sequence. Thus, the equation includes the matrix multiplication of the input array X with Kronecker multiplication of the polar kernel matrix. The granularity for the encoding is a symbol. In binary polar coding, each symbol corresponds to a single bit of information, whereas in non-binary polar coding, each symbol corresponds to multiple bits of information. After the encoding process (e.g., 412), a wireless transmitter (e.g., 404) transmits an encoded transmission (e.g., 414) based on the output X. The receiving device (e.g., 402) receives a transmission based on the output X (e.g., in the encoded transmission 414) and performs SC or SCL decoding (e.g., at 416), e.g., as described in connection with FIG. 5, to obtain the information of the input symbols U that were encoded (e.g., at 418). Due to the transmission environment, e.g., channel, the received transmission might have changes from the output X based on noise or other channel disturbances.

Figure 6:
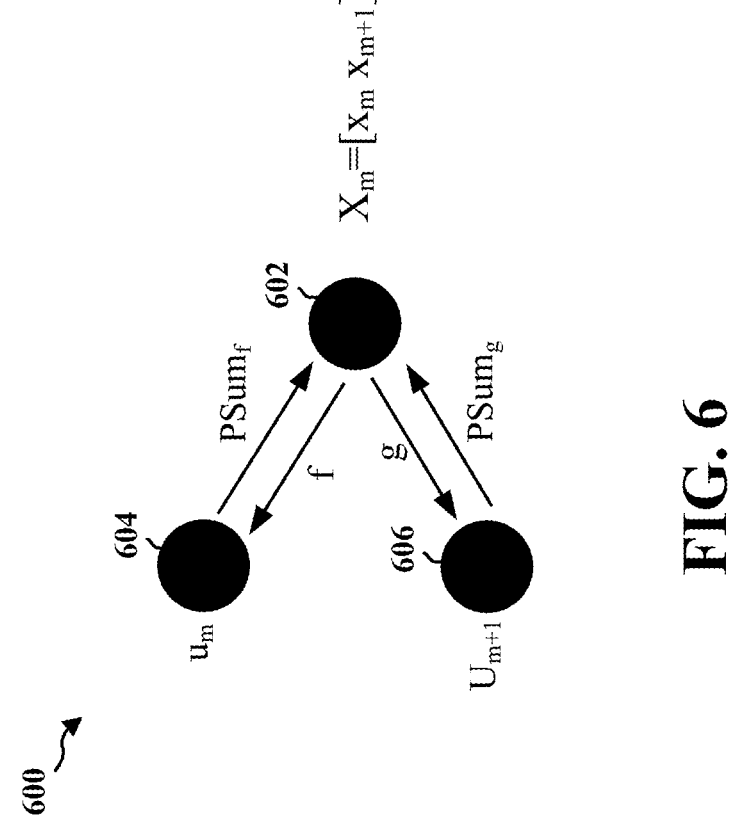
FIG. 6 illustrates an example of a partial sum tree propagation example based on functions f and g for a non-binary polar decoding algorithm, in accordance with various aspects of the present disclosure.

FIG. 6 illustrates an example of a partial sum tree propagation example 600 based on functions f and g for a non-binary polar decoding algorithm. The soft metrics of a parent node 602 and the soft metrics of the top child node 604 are related via a function that may be referred to as an "f" function. The soft metrics at the parent node 602 and the soft metrics of the bottom child node 606 are related via a function that may be referred to as a "g" function. When a decision is made about a decoded symbol at the leaf, the results, which may be referred to as a "partial sum," is provided back to the parent nodes. For example, FIG. 6 illustrates the partial sum ($PSum_f$) for the leaf node $u_m$ (e.g., 604) being provided to the parent node 602. FIG. 6 also illustrates the partial sum ($PSum_g$) for the leaf node $u_{m+1}$ (e.g., 606) being provided to the parent node 602.

The probabilities of random variables in GF(q) can be represented by a probability mass function (PMF) of the random variables. The PMF shows the probability of a random variable having each value of the q-ary Galois Field elements (e.g., GF(q) elements). For example, q represented the order of the Galois Field, e.g., GF(2) has 2 elements (e.g., which may be 0 or 1), GF(4) has 4 elements (e.g., potential values). The following equation shows an example PMF that a random variable ($x_i$) has a value of $f_i$:

$$PMF_{x_i}(f_i) \stackrel{def}{=} Pr(x_i = f_i) \forall\ f_i \in GF(q) \tag{Equation 1}$$

In an example in which the Galois Field has four elements (e.g., GF(4)), the PMF of the variable $x_i$ for the four potential values (e.g., 0, 1, $\alpha$, $\alpha^2$) may be represented as:

$$PMF_{x_i}(0) = 0.19,\ PMF_{x_i}(1) = 0.28,\ PMF_{x_i}(\alpha) = 0.34,\ PMF_{x_i}(\alpha^2) = 0.19$$

As illustrated for this example, the sum of the different probabilities is 1, e.g., (0.19+0.28+0.34+0.19=1).

The probability values may have a wide range from very small numbers to 1, and the wide range can cause numerical challenges. Aspects presented herein provide for the use of a different version of the probability values such as a logarithmic version to reduce the numerical challenges. For example, the probabilities can be normalized by the probability of the random variable x; taking element "0" (e.g., $Pr(x_i=0)$). By normalizing a set of probability values to one of the probability values, the number of values that are maintained can be reduced. For example, if there are four probability values, and three of the probability values are normalized to the probability of the random variable being "0," then three probability values can be maintained rather than four.

The following equation illustrates an example of a logarithmic normalized version of random variable probability values in GF(q) for variable $x_i$ having a value $f_i$:

$$L_{x_i}(f_i) \stackrel{def}{=} \ln\left(\frac{Pr(x_i = f_i)}{Pr(x_i = 0)}\right) = \ln\left(\frac{PMF_{x_i}(f_i)}{PMF_{x_i}(0)}\right) \tag{Equation 2}$$

$$L_{x_i}(0) = 0$$

Therefore, the following equation shows the relationship between the logarithmic normalized value and the PMF:

$$\text{(Equation 3)}$$

$$Pr(x_i = f_i) = PMF_{x_i}(f_i) = Pr(x_i = 0) \cdot e^{L_{x_i}(f_i)} = PMF_{x_i}(0) \cdot e^{L_{x_i}(f_i)}$$

Because the sum of the probabilities for each of the potential values of the random variable $x_i$ must be one:

$$\sum_{\forall f_i \in GF(q)} Pr(x_i = f_i) = \sum_{\forall f_i \in GF(q)} PMF_{x_i}(f_i) = 1 \tag{Equation 4}$$

With some substitutions, the equation becomes:

$$Pr(x_i = f_i) = PMF_{x_i}(f_i) = \frac{e^{L_{x_i}(f_i)}}{\sum_{\forall k \in GF(q)} e^{L_{x_i}(k)}} \tag{Equation 5}$$

In equation 5, k represents one element of the Galois field (GF(q)), e.g., $\forall k \in GF(q)$ means every element of the GF(q). For example, the q Probabilities $(Pr(x_i=f_l)=PMF_{x_i}(f_l), \forall x_i \forall GF(q)))$ can be written based on (q−1) logarithmic normalized values, e.g., $(L_{x_i}(f_l), \forall f_l \in GF(q)$ & $f_l \neq 0, L_{x_i}(0)=0)$. The (q−1) probability values (e.g., rather than q probability values) can be carried over through the decoder ability for the value a is the highest (e.g., 0.57), it may be determined that a is the most likely value for the variable $\hat{x}_i$. In this example, the "hard decision" determines a as the value for the variable $\hat{x}_i$.

An entropy computation $H(x_i)$ may be performed for a random variable $x_i$ in GF(q). The entropy computation may be represented as:

(Equation 8)

$$H(x_i) \overset{def}{=} -\sum_{f_l} P(x_i = f_l) \log_q (P(x_i = f_l)) = -\sum_{f_l} \left( \frac{e^{L_{x_i}(f_l)}}{\sum_{\forall k \in GF(q)} e^{L_{x_i}(k)}} \right) \log_q \left( \frac{e^{L_{x_i}(f_l)}}{\sum_{\forall k \in GF(q)} e^{L_{x_i}(k)}} \right)$$

$$= -\left( \frac{1}{\ln(q)} \right) \cdot \sum_{f_l} \left( \frac{e^{L_{x_i}(f_l)}}{\sum_{\forall k \in GF(q)} e^{L_{x_i}(k)}} \right) \ln \left( \frac{e^{L_{x_i}(f_l)}}{\sum_{\forall k \in GF(q)} e^{L_{x_i}(k)}} \right)$$

$$= \left( \frac{1}{\ln(q)} \right) \cdot \sum_{f_l} \left( \frac{e^{L_{x_i}(f_l)} \left( \ln \left( \sum_{\forall k \in GF(q)} e^{L_{x_i}(k)} \right) - L_{x_i}(f_l) \right)}{\sum_{\forall k \in GF(q)} e^{L_{x_i}(k)}} \right)$$

$$= \left( \frac{1}{\ln(q)} \right) \cdot \frac{\sum_{f_l} \left( e^{L_{x_i}(f_l)} \left( \ln \left( \sum_{\forall k \in GF(q)} e^{L_{x_i}(k)} \right) - L_{x_i}(f_l) \right) \right)}{\sum_{\forall k \in GF(q)} e^{L_{x_i}(k)}}$$

hardware at a receiver, which reduces, or minimizes, the complexity of the decoding and the corresponding hardware. For example, the probabilities determined as a part of the decoding at 416 may be based on the logarithmic normalized values, e.g., as described in connection with equations 1-5.

The f and g functions (e.g., which may be referred to as f and g equations) for the traversal of the non-binary Polar SC or SCL decoder may also be based on the (q−1) values. For example, the f and g functions may enable the decoder to provide hard decisions on random variables using the logarithmic normalized values in GF(q).

For example, a hard decision about a value (e.g., a value of a leaf node as described in connection with FIG. 5) may be represented as:

$$\hat{x}_i \overset{def}{=} \operatorname{argmax}(L_{xi}(f_l)), \text{ where } \forall f_l \in GF(q) \qquad \text{(Equation 6)}$$

The hard decision, for example, may be based on a maximum of the probabilities for the different potential values. The maximum of the normalized values may be represented as:

$$\operatorname{Max}\left(0, L_{x_i}(1), L_{x_i}(\alpha), L_{x_i}(\alpha^2), \dots, L_{x_i}(\alpha^{q-2})\right) = L_{x_i}(\hat{x}_i) \qquad \text{(Equation 7)}$$

For example, in some aspects, the decoding performed at 416 may be based on the maximum of the normalized values. In an example for GF(4) with 4 potential values (e.g., 0, 1, $\alpha$, $\alpha^2$), the logarithmic normalized versions of the random variable probability values correspond to:

$$L_{x_i}(0) = 0, L_{x_i}(1) = 0.31, L_{x_i}(\alpha) = 0.57, L_{x_i}(\alpha^2) = 0 = > \hat{x}_i = \alpha$$

As shown for this example, the logarithmic normalized version of the random variable probability values may not add to 1 (e.g., 0+0.31+0.57+0≠1). As the normalized prob- As described above, for SCL decoding, rather than make a hard decision for each symbol as the tree is traversed to the leaf nodes, multiple possibilities are maintained along with a path metric (PM) that allows the list of possibilities to be pruned at a certain point (e.g., discarding some possibilities and maintaining the other possibilities). The path metric for SCL decoding (e.g., at 416) may be calculated as:

(Equation 9)

$$PM_{[u_0=f_{l0},u_1=f_{l1},\dots,u_j=f_{lj}]} \overset{\Delta}{=} \sum_{i=0}^{j} -\log(P(u_i = f_{li}))$$

(Equation 10)

$$PM_{[u_i=f_{li}]} \overset{\Delta}{=} -\ln(P(u_i = f_{li})) =$$

$$-\ln\left( \frac{P(u_i = f_{li})}{P(0)} \cdot P(0) \right) = -\ln(P(0)) - L_{u_i}(f_{li}) =$$

$$\ln\left( \frac{1}{P(0)} \right) - L_{u_i}(f_{li}) = \ln\left( \sum_{\forall k \in GF(q)} e^{L_{u_i}(k)} \right) - L_{u_i}(f_{li})$$

As presented herein, the equation can be approximated to enable a reduction in complexity at the receiver 402, e.g., enabling a more hardware friendly decoding of a polar encoded transmission (e.g., 414). For example, the path metric may be approximated as a maximum function as part of the decoding at 416. With approximation using the maximum function, the path metric equation for each set of bits (which may also be referred to as a symbol) at a leaf node (e.g., $u_i$) can be represented as:

(Equation 11)

$$PM_{[u_i=f_{li}]} \cong$$

$$\operatorname{Max}\left(0, L_{u_i}(1), L_{u_i}(\alpha), L_{u_i}(\alpha^2), \dots, L_{u_i}(\alpha^{q-2})\right) - L_{u_i}(f_{li})$$

The path metric (PM) associated with a sequence of symbols (e.g., $u_0, u_1, \dots, u_j$) (e.g., $PM_{[u_0=f_{l0},u_1=f_{l1},\dots,u_j=f_{lj}]}$) can then be represented as the sum of the path metric for each of the individual symbols:

$$PM_{[u_0=f_{l0},u_1=f_{l_1},\dots,u_j=f_{lj}]} = \sum_{i=0}^{j} PM_{[u_i=f_{li}]}$$

(Equation 12)

For example, the path metric associated with the sequence of symbols may be based on the sum of the approximated (based on the maximum function) path metric for each of the individual symbols. The use of the maximum approximation can help to reduce the complexity in the processing at the decoder.

As an example, for a node with a code length $M=2^N$, the node variable vector, X, may be related to the leaf variable vector as:

$$X = U \otimes (G^{*N})$$

In this equation, G is the 2×2 generic Polar kernel matrix of $$\begin{bmatrix} a & 0 \\ c & b \end{bmatrix},$$

represents the multiplication in Gf(q), and "*" is the Kronecker product. The summation of the PM computed using the above-mentioned equation at the child leaf nodes of a parent node using U=Ú in the SC decoder is equivalent to the PM computed at the node using variable $X=Ú\otimes G^{*N}$:

$$PM_{U=Ú} = PM_{X=Ú\otimes G^{*N}}$$

(Equation 13)

For a node with length of 2, if $u_0=f_{l0}$ and $u_1=f_{l1}$, then $\hat{x_0}=(c\otimes f_{l1})\oplus(f_{l0}\otimes a)$, and $\hat{x_1}=b\otimes f_{l1}$, where $\oplus$ is the addition in Gf(q). Also:

$$PM_{[u_0=f_{l0},u_1=f_{l1}]} =$$

$$\ln\left(\sum_{\forall k\in GF(q)} e^{L_{u_0}(k)}\right) - L_{u_0}(f_{l0}) + \ln\left(\sum_{\forall k\in GF(q)} e^{L_{u_1}(k)}\right) - L_{u_1}(f_{l1})$$

$$\ln\left(\sum_{\forall k\in GF(q)} e^{L_{u_0}(k)}\right) - L_{u_0}(f_{l0}) = \ln\left[\frac{\sum_{\forall k\in GF(q)}\sum'_{\forall k\in GF(q)} e^{L_{x_0}\left(a\otimes(k\oplus k')\right)+L_{x_1}\left(a\otimes b\otimes c^{-1}\oplus k'\right)}}{\sum_{\forall k\in GF(q)} e^{L_{x_0}(a\otimes k)+L_{x_1}(a\otimes b\otimes c^{-1}\otimes k)}}\right] -$$

$$\ln\left[\frac{\sum_{\forall k\in GF(q)} e^{L_{x_0}(a\otimes(f_{l0}\otimes k))+L_{x_1}(a\otimes b\otimes c^{-1}\otimes k)}}{\sum_{\forall k\in GF(q)} e^{L_{x_0}(a\otimes k)+L_{x_1}(a\otimes b\otimes c^{-1}\otimes k)}}\right]$$

$$= \ln\left[\frac{\sum_{\forall k\in GF(q)}\sum'_{\forall k\in GF(q)} e^{L_{x_0}\left(a\otimes(k\oplus k')\right)+L_{x_1}\left(a\otimes b\otimes c^{-1}\oplus k'\right)}}{\sum_{\forall k\in GF(q)} e^{L_{x_0}(a\otimes(f_{l0}\otimes k))+L_{x_1}(a\otimes b\otimes c^{-1}\otimes k)}}\right]$$

$$= \ln\left[\frac{\sum'_{\forall k\in GF(q)}\sum_{\forall k\in GF(q)} e^{L_{x_0}\left(a\otimes(k\oplus k')\right)+L_{x_1}\left(a\otimes b\otimes c^{-1}\oplus k'\right)}}{\sum_{\forall k\in GF(q)} e^{L_{x_0}(a\otimes(f_{l0}\otimes k))+L_{x_1}(a\otimes b\otimes c^{-1}\otimes k)}}\right]$$

-continued $$= \ln\left[\frac{\sum_{\forall k\in GF(q)} e^{L_{x_1}\left(a\otimes b\otimes c^{-1}\otimes k'\right)}\cdot\left(\sum_{\forall k\in GF(q)} e^{L_{x_0}\left(a\otimes(k\oplus k')\right)}\right)}{\sum_{\forall k\in GF(q)} e^{L_{x_0}(a\otimes(f_{l0}\oplus k))+L_{x_1}(a\otimes b\otimes c^{-1}\otimes k)}}\right]$$

$$= \ln\left[\frac{\left(\sum_{\forall k\in GF(q)} e^{L_{x_1}\left(a\otimes b\otimes c^{-1}\otimes k'\right)}\right)\cdot\left(\sum_{\forall k\in GF(q)} e^{L_{x_0}\left(a\otimes(k\oplus k')\right)}\right)}{\sum_{\forall k\in GF(q)} e^{L_{x_0}(a\otimes(f_{l0}\oplus k))+L_{x_1}(a\otimes b\otimes c^{-1}\otimes k)}}\right]$$

$$= \ln\left[\frac{\left(\sum_{\forall k\in GF(q)} e^{L_{x_0}(k)}\right)\cdot\left(\sum_{\forall k\in GF(q)} e^{L_{x_1}(k')}\right)}{\sum_{\forall k\in GF(q)} e^{L_{x_0}(a\otimes(f_{l0}\oplus k))+L_{x_1}(a\otimes b\otimes c^{-1}\otimes k)}}\right]$$

$$\ln\left(\sum_{\forall k\in GF(q)} e^{L_{u_1}(k)}\right) - L_{u_1}(f_{l1}) = \ln\left[\frac{\sum_{\forall k\in GF(q)} e^{L_{x_0}((c\otimes k)\oplus(f_{l0}\otimes a)+L_{x_1}(b\otimes k)-L_{x_0}(f_{l0}\otimes a)}}{}\right] -$$

$$= L_{x_0}((c\otimes f_{l1})\oplus(f_{l0}\otimes a) - L_{x_1}(b\otimes f_{l1}) + L_{x_0}(f_{l0}\otimes a)$$

$$= \ln\left[\frac{\sum_{\forall k\in GF(q)}}{e^{L_{x_0}(c\otimes k)\oplus(f_{l0}\oplus a))+L_{x_1}(b\otimes k)}}\right] - L_{x_0}((c\otimes f_{l1})\oplus(f_{l0}\otimes a)) - L_{x_1}(b\otimes f_{l1})$$

$$PM_{u_0}(f_{l0}) + PM_{u_1}(f_{l1_l}) = \ln\left[\frac{\left(\sum_{\forall k\in GF(q)} e^{L_{x_0}(k)}\right)\cdot\left(\sum'_{\forall k\in GF(q)} e^{L_{x_1}(k')}\right)\cdot\left(\sum_{\forall k\in GF(q)} e^{L_{x_0}((c\otimes k)\oplus(f_{l0}\otimes a))+L_{x_1}(b\otimes k)}\right)}{\sum_{\forall k\in GF(q)} e^{L_{x_0}(a\otimes(f_{l0}\oplus k))+L_{x_1}(a\otimes b\otimes c^{-1}\otimes k)}}\right] -$$

$$L_{x_0}((c\otimes f_{l1})\oplus(f_{l0}\otimes a)) - L_{x_1}(b\otimes f_{l1})$$

$$= \ln\left[\left(\sum_{\forall k\in GF(q)} e^{L_{x_0}(k)}\right)\cdot\left(\sum'_{\forall k\in GF(q)} e^{L_{x_1}(k')}\right)\right] - L_{x_0}((c\otimes f_{l1})\oplus(f_{l0}\otimes a)) - L_{x_1}(b\otimes f_{l1})$$

$$= \ln\left(\sum_{\forall k\in GF(q)} e^{L_{x_0}(k)}\right) - L_{x_0}((c\otimes f_{l1})\oplus(f_{l0}\otimes a)) + \ln\left(\sum_{\forall k\in GF(q)} e^{L_{x_1}(k')}\right) - L_{x_1}(b\otimes f_{l1}) = PM_{x_0}((c\otimes f_{l1})\oplus f_{l0}) + PM_{x_1}(b\otimes f_{l1})$$

$$= PM_{x_0}(\hat{x_0}) + PM_{x_1}(\hat{x_1})$$

If two child nodes each with length N (the node "0" with leaf node variable array of $$U_0^N$$

and node variable array of $$X_0^N$$

and the node "1" with leaf node variable array of $$U_1^N$$

and node variable array of $$X_1^N$$

) follow this property, their parent node with length 2N (and the leaf node variable array of $$U^{2N} = \left[ U_0^N, U_1^N \right]$$

and node variable array of $X^{2N}$) also follows the same property. In other words, if:

$$PM_{U_0^N = \acute{U}0} = PM_{X_o^N = \acute{U}0 \otimes G^* N} \text{ and} \qquad \text{(Equation 14)}$$

$$PM_{U_1^N = \acute{U}1} = PM_{X_1^N = \acute{U}1 \otimes G^* N} \qquad \text{(Equation 15)}$$

Then:

$$PM_{U^{2N} = [\acute{U}0, \acute{U}1]} = PM_{X^{2N} = [\acute{U}0, \acute{U}1] \otimes G^* 2N} \qquad \text{(Equation 16)}$$

Based on the Polar kernel property:

$$PM_{X^{2N}} = PM_{\left[ a \otimes X_0^N + c \otimes X_1^N, b \otimes X_1^N \right]} \qquad \text{(Equation 17)}$$

Therefore, the right-hand side of equation 16 can be written as following using equation:

$$PM_{X^{2N} = [\acute{U}0, \acute{U}1] \otimes G^* 2N} = PM_{\left[ a \otimes X_0^N + c \otimes X_1^N, b \otimes X_1^N \right] = [\acute{U}0, \acute{U}1] \otimes G^* 2N} =$$

$$PM_{\left[ a \otimes X_0^N + c \otimes X_1^N, b \otimes X_1^N \right] = [\acute{U}0, \acute{U}1] \otimes \begin{bmatrix} a \otimes G^* & 0 \\ cG^* N & bG^* N \end{bmatrix}} =$$

$$PM_{\left[ a \otimes X_0^N + c \otimes X_1^N, b \otimes X_1^N \right] = [a \otimes \acute{U}0 \otimes G^* N + c \otimes \acute{U}1 \otimes G^* N, b \otimes \acute{U}1 \otimes G^* N]} =$$

$$PM_{\left[ X_0^N, X_1^N \right] = [\acute{U}0 \otimes G^* N, \acute{U}1 \otimes G^* N]} = PM_{X_0^N = \acute{U}0 \otimes G^* N} + PM_{X_1^N = \acute{U}1 \otimes G^* N} =$$

$$PM_{U_0^N = \acute{U}0} + PM_{U_1^N = \acute{U}1} = PM_{U^{2N} = [\acute{U}0, \acute{U}1]} \quad \text{65}$$

Figure 7:
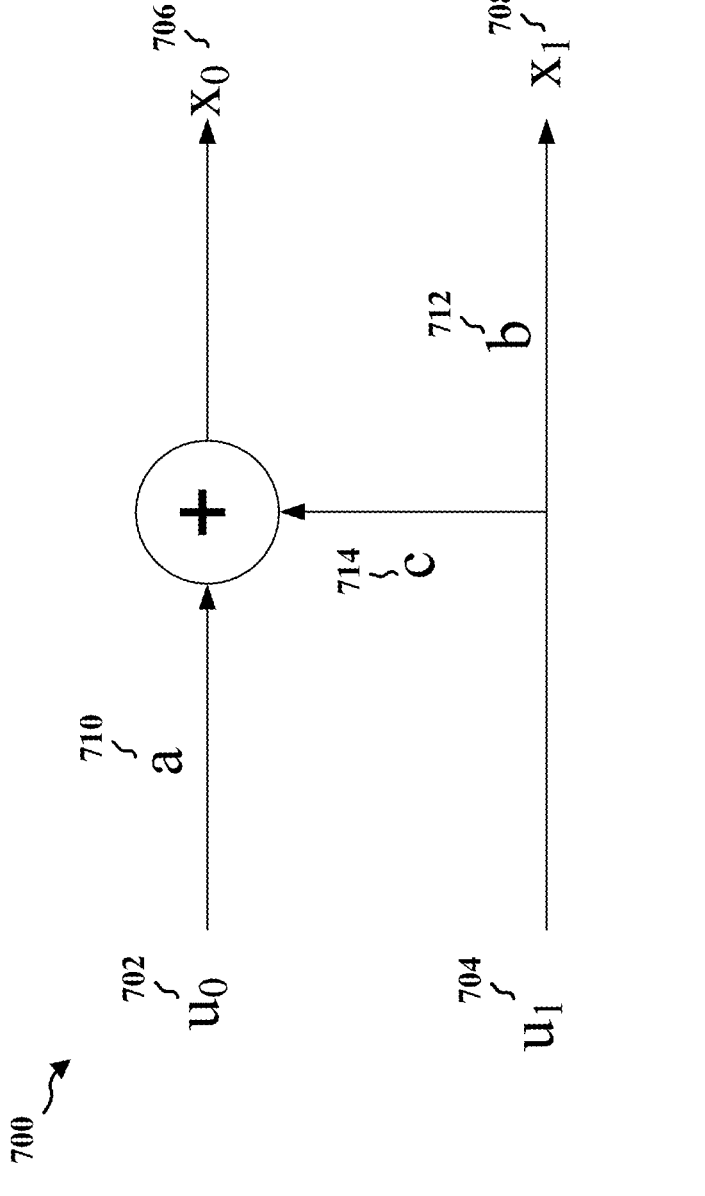
FIG. 7 illustrates an example of transformation of symbols based on a Polar kernel, in accordance with various aspects of the present disclosure.

As illustrated at 416, in FIG. 4, a receiver 402 may perform polar decoding on a received transmission (e.g., 414) to obtain the information carried in the transmission. The decoding, at 416, may be based on successive cancellation or on SCL, for example. For an example in which the polar encoding (at 412) and the corresponding polar decoding (at 416) is based on a 2×2 Polar kernel is $$\begin{bmatrix} a & 0 \\ c & b \end{bmatrix},$$

the f and g equations (e.g., in FIG. 6) may be represented as shown in the example 700 in FIG. 7. In this example, $u_0$ (702) and $u_1$ (704) represent the symbol input (of multiple bits) that is input at the transmitter (e.g., 404 in FIG. 4). The Polar kernel transformation $$\begin{bmatrix} a & 0 \\ c & b \end{bmatrix}$$

leads to $x_0$ (706) and $x_1$ (708) symbols (of multiple bits) to be output by the encoder for transmission by the transmitter. For example, a (710), b (712), and c (714) of the Polar kernel transform input symbols $u_0$ (702) and $u_1$ (704) to encoded symbols $x_0$ (702) and $x_1$ (704).

The receiver 402 receives the encoded transmission 414 with symbols $x_0$ and $x_1$ and performs a corresponding Polar decoding (e.g., based on SC or SCL as described in connection with FIG. 5) to determine the initial input symbols (e.g., $u_0$ and $u_1$), at 418. The SC or SCL decoder determines an estimation of the initial input symbols. As part of decoding the received symbols, the receiver may determine the probability of $u_0$ having a value of $f_l$ (e.g., $Pr(u_0 = f_l)$) and the probability of $u_1$ having a value of $f_l$ (e.g., $Pr(u_1 = f_l)$). The probabilities may be represented as:

$$\text{(Equation 18)}$$

$$Pr(u_0 = f_l) =$$
$$PMF_{u_0}(f_l) = PMF_{x_0}(a \otimes f_l) \star PMF_{x_1}\left( a \otimes b \otimes c^{-1} \otimes f_l \right) =$$

$$\sum_{k=0}^{a^{q-2}} PMF_{x_1}\left( a \otimes b \otimes c^{-1} \otimes k \right) \cdot PMF_{x_0}(a \otimes (f_l \oplus k))$$

and $$Pr(u_1 = f_l) = \qquad \text{(Equation 19)}$$

$$PMF_{u_1}(f_l) = PMF_{x_1}(b \otimes f_l) \cdot PMF_{x_0}((c \otimes f_l) \oplus (\hat{u}_0 \otimes a))$$

Therefore, with the use of the logarithmic normalization, the probabilities $Pr(u_0 = f_l)$ and $Pr(u_1 = f_l)$ may be calculated as:

$$\text{(Equation 20)}$$

$$Pr(u_0 = f_l) =$$

$$PMF_{u_0}(f_l) = \frac{\sum_{\forall k \in GF(q)} e^{L_{x_0}(a \otimes (f_l \oplus k)) + L_{x_1}(a \otimes b \otimes c^{-1} \otimes k)}}{\left( \sum_{\forall k \in GF(q)} e^{L_{x_0}(k)} \right) \left( \sum_{\forall k \in GF(q)} e^{L_{x_1}(k)} \right)}$$

-continued (Equation 21)

$$Pr(u_1 = f_i) =$$

$$PMF_{u_1}(f_i) = \frac{e^{L_{x_0}\left((c \otimes f_i) \oplus (\widehat{u_0} \otimes a)\right) + L_{x_1}(b \otimes f_i)}}{\left(\sum_{\forall k \in GF(q)} e^{L_{x_0}(k)}\right)\left(\sum_{\forall k \in GF(q)} e^{L_{x_1}(k)}\right)}$$

The f and g functions can be written as the logarithmic normalized value of the probability of $u_0$ having a value of $f_i$ (e.g., $L_{u_0}(f_i)$):

(Equation 22)

$$L_{u_0}(f_i) = \ln\left(\frac{Pr(u_0 = f_i)}{Pr(u_0 = 0)}\right) =$$

$$\ln\left(\frac{\sum_{\forall k \in GF(q)} e^{L_{x_0}(a \otimes (f_i \oplus k)) + L_{x_1}(a \otimes b \otimes c^{-1} \otimes k)}}{\sum_{\forall k \in GF(q)} e^{L_{x_0}(a \otimes k) + L_{x_1}(a \otimes b \otimes c^{-1} \otimes k)}}\right)$$

and the logarithmic normalized value of the probability of $u_1$ having a value of $f_i$ (e.g., $L_{u_1}(f_i)$):

(Equation 23)

$$L_{u_1}(f_i) = \ln\left(\frac{Pr(u_0 = f_i)}{Pr(u_0 = 0)}\right) =$$

$$L_{x_0}((c \otimes f_i) \oplus (\widehat{u_0} \otimes a)) + L_{x_1}(b \otimes f_i) - L_{x_0}(\widehat{u_0} \otimes a)$$

As presented herein, the f and g functions can be approximated to enable a reduction in complexity at the receiver. For example, the f function may be approximated (e.g., as a maximum function) as:

(Equation 24)

$$L_{u_0}(f_i) \cong$$

$$\mathrm{Max}\big(L_{x_0}(a \otimes f_i),\ L_{x_0}(a \otimes (f_i \oplus 1)) + L_{x_1}(a \otimes b \otimes c^{-1}),$$

$$L_{x_0}(a \otimes (f_i \oplus \alpha)) + L_{x_1}(a \otimes b \otimes c^{-1} \otimes \alpha),$$

$$L_{x_0}(a \otimes (f_i \oplus \alpha^2)) + L_{x_1}(a \otimes b \otimes c^{-1} \otimes \alpha^2),\ \dots\ ,$$

$$L_{x_0}(a \otimes (f_i \oplus \alpha^{q-2})) + L_{x_1}(a \otimes b \otimes c^{-1} \otimes \alpha^{q-2})\big) - \mathrm{Max}\big(0,$$

$$L_{x_0}(a) + L_{x_1}(a \otimes b \otimes c^{-1}),\ L_{x_0}(a \otimes \alpha) + L_{x_1}(a \otimes b \otimes c^{-1} \otimes \alpha),$$

$$L_{x_0}(a \otimes \alpha^2) + L_{x_1}(a \otimes b \otimes c^{-1} \otimes \alpha^2),\ \dots\ ,$$

$$L_{x_0}(a \otimes \alpha^{q-2}) + L_{x_1}(a \otimes b \otimes c^{-1} \otimes \alpha^{q-2})\big)$$

The g function may be determined without approximation. For example, the g function may be represented as:

(Equation 25)

$$L_{u_1}(f_i) = \ln\left(\frac{Pr(u_1 = f_i)}{Pr(u_1 = 0)}\right) =$$

$$L_{x_0}((c \otimes f_i) \oplus (\widehat{u_0} \otimes a)) + L_{x_1}(b \otimes f_i) - L_{x_0}(\widehat{u_0} \otimes a)$$

Special Nodes

As described in connection FIG. 5, some nodes may have certain properties that can be used to perform successive cancellation or successive cancelation list decoding more quickly. In some aspects, based on the property of the node, the SC or SCL may be performed more quickly by avoiding, or skipping, traversing a part of the SC/SCL tree. Among various examples, such nodes may include one or more of Rate-0 nodes (e.g., for which the child leaf nodes are frozen symbols), Rate-1 nodes (e.g., for which each leaf node corresponds to information symbols), weighted repetition (WREP) parent nodes (e.g., having leaf nodes that are frozen except for a bottom leaf node that corresponds to an information symbol), single parity check (SPC) nodes (e.g., having leaf nodes that correspond to information symbols except a top leaf node that corresponds to a frozen symbol). FIG. 4 illustrates, at 415, that the decoding performed by the receiver 402 may be based on one or more of the special nodes.

Rate-0 Nodes

Figure 8:
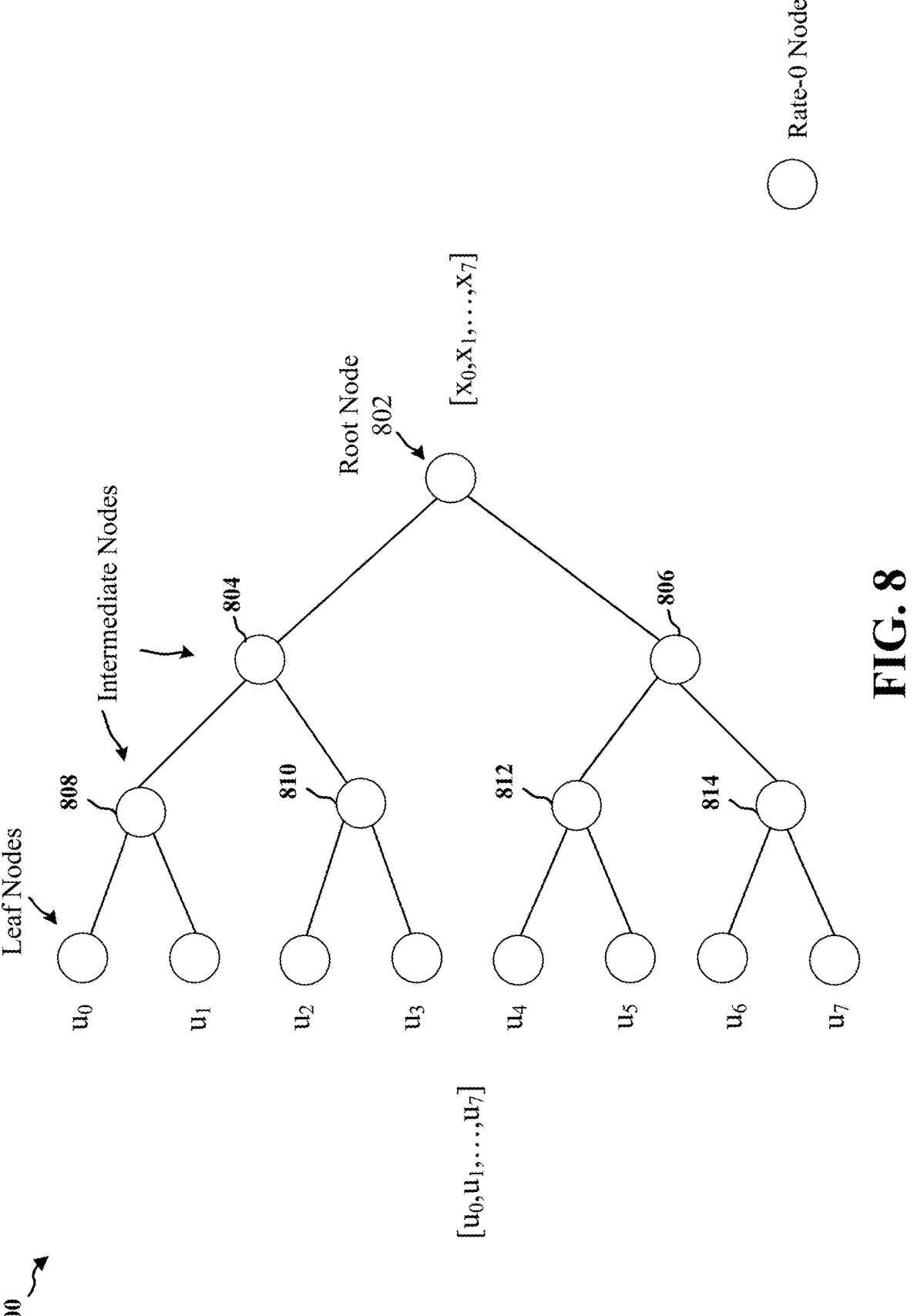
FIG. 8 illustrates an example of Rate-0 node, in accordance with various aspects of the present disclosure.

The aspects presented herein may be applied for Rate-0 nodes to enable a reduction in receiver complexity for decoding non-binary Polar encoded transmissions. A Rate-O node is a node for which each of the child leaf nodes is known or frozen (e.g., zero symbols or symbols that are assumed to be zero). FIG. 8 illustrates an example 800 of Rate-0 parent nodes. For example, root node 802 is a Rate-0 node because each of the child leaf nodes (e.g., for $u_0$-$u_7$) are for known or frozen symbols. Similarly, intermediate nodes 804, 806, 808, 810, 812, and 814 are Rate-0 nodes, because each of their child leaf nodes are for known or frozen symbols. In some aspects, to take advantage of this special type of node, a closest rate-0 node to the root (i.e. the highest level rate-O node) may be identified. Although there are other rate-0 nodes between this highest level rate-0 and the leaf nodes, they might be disregarded for decoding, and the decoding may be based on the highest level rate-0 node.

For example, all of the child leaf nodes of a Rate-0 parent node with length M=2N are frozen (e.g., zero or known) symbols. For this type of node (e.g., Rate-0 parent node), no further processing is needed to compute the leaf decision (e.g., in SC or SCL decoder) because the leaf nodes are all known symbols (e.g., zero).

The propagation of the probabilities through an SCL decoding tree might not result in a hard decision corresponding to zero. In order to more effectively address the Rate-0 nodes, a path metric penalty may be computed. The path metric penalty (e.g., PM penalty) can be computed at the parent node, rather than being computed at the leaf nodes. Therefore, the decoder can skip traversal of child nodes of a Rate-0 parent node can be skipped, resulting in a faster decoding process. As an example, the path metric for a Rate-0 parent node (e.g., rather than at a least node) can be calculated as:

(Equation 26)

$$PM_{[u_0=0, u_1=0, \dots, u_{M-1}=0]} =$$

$$PM_{[x_0=0, x_1=0, \dots, x_{M-1}=0]} = \sum_{i=0}^{M-1}\left(\ln\left(\sum_{\forall k \in GF(q)} e^{L_{x_i}(k)}\right)\right)$$

The path metric can be approximated as:

(Equation 27)

$$PM_{[u_0=0, u_1=0, \dots, u_{M-1}=0]} = PM_{[x_0=0, x_1=0, \dots, x_{M-1}=0]} \cong$$

$$\sum_{i=0}^{M-1} \mathrm{Max}\big(0,\ L_{x_i}(1),\ L_{x_i}(\alpha),\ L_{x_i}(\alpha^2),\ \dots\ ,\ L_{x_i}(\alpha^{q-2})\big)$$

For example, as part of the decoding of an encoded transmission 414, the receiver 402 may apply the Rate-0 node calculations presented herein to a GF(q) Polar SC List decoder, and the receiver 402 may calculate a path metric using a maximum approximation.

Rate-1 Nodes

Figure 9:
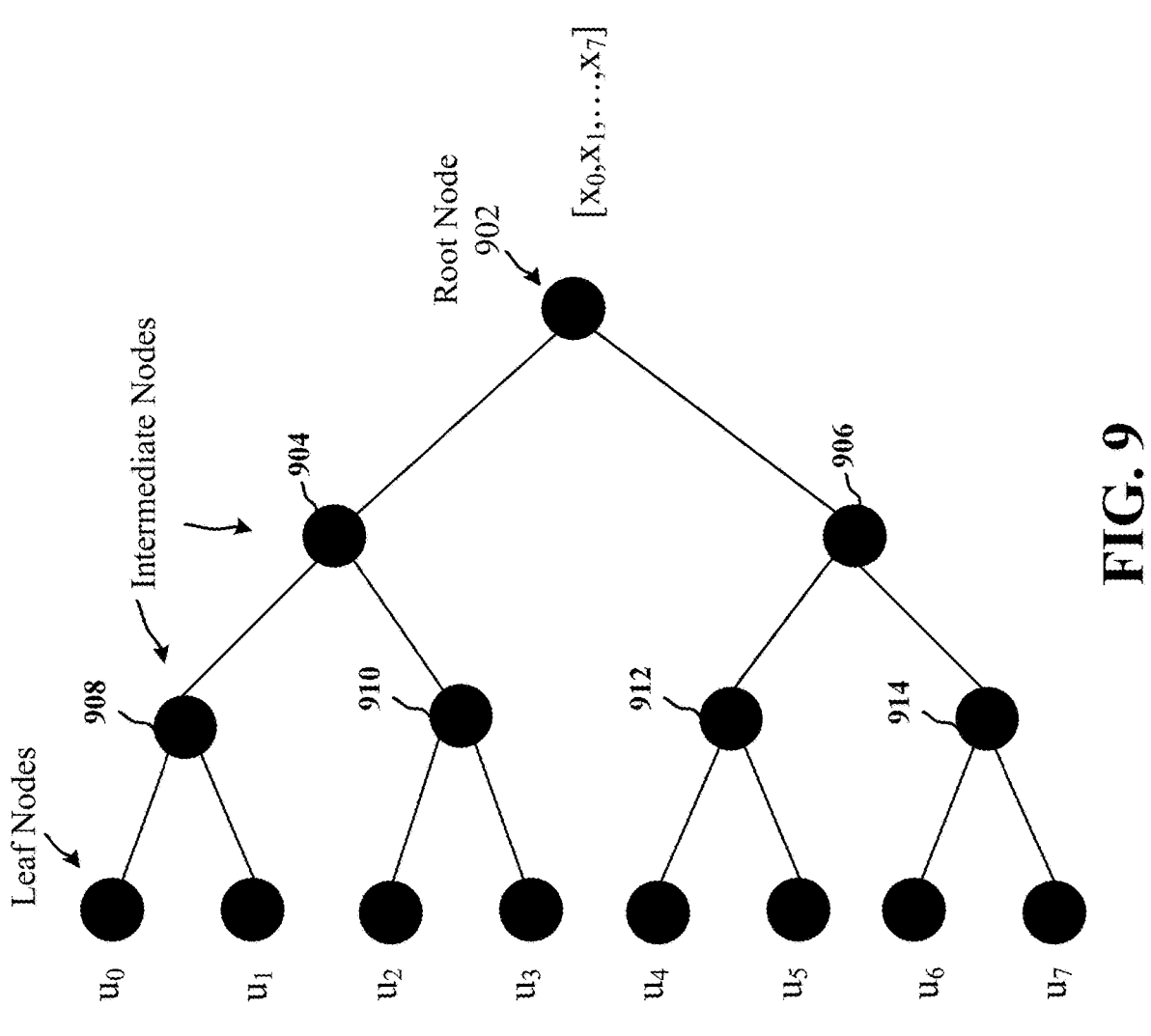
FIG. 9 illustrates an example of a Rate-1 node, in accordance with various aspects of the present disclosure.

In contrast to Rate-0 nodes, in which all of the leaf nodes are frozen or known symbols (e.g., of multiple bits), a Rate-1 node is a node for which all of the leaf nodes are information symbols (e.g., and are not frozen). FIG. 9 illustrates an example 900 of Rate-1 parent nodes. For example, root node 902 is a Rate-1 node having a length of 8, and each of the child leaf nodes (e.g., for $u_0$-$u_7$) are for information symbols. Similarly, intermediate nodes 904, 906, 908, 910, 912, and 914 are Rate-1 nodes, because each of their child leaf nodes are for information symbols. In some aspects, to take advantage of this special type of node, a closest rate-1 node to the root (i.e. the highest level rate-1 node) may be identified. Although there are other rate-1 nodes between this highest level rate-1 and the leaf nodes, they might be disregarded for decoding, and the decoding may be based on the highest level rate-1 node.

In SC decoding, the information symbols may be computed without traversing the leaf nodes. Rather than traversing the leaf nodes, the information symbols (e.g., $x_i$ for i=1-7 or $x_0$-$x_7$) can be computed by:

$$\hat{x}_i = \mathrm{argmax}\left(L_{x_i}(f_l)\right), \tag{Equation 28}$$

where $\forall f_l \in GF(q)$ and $i \in \{0, 1, \dots, M-1\}$ $$\hat{U} = [\widehat{u_0}, \widehat{u_1}, \dots, \widehat{u_{M-1}}] = [\widehat{x_0}, \widehat{x_1}, \dots, \widehat{x_{M-1}}]. \tag{Equation 29}$$

$$\left(G^{\otimes N}\right)^{-1} = (\hat{X}_{[x_0 = \widehat{x_0}, x_1 = \widehat{x_1}, \dots, x_{M-1} = \widehat{x_{M-1}}]}).\left(G^{\otimes N}\right)^{-1},$$

where $\forall f_l \in GF(q)$ and $G$ is the $\begin{bmatrix} a & 0 \\ c & b \end{bmatrix}$ In an SCL decoding algorithm employed by the decoder, each of the leaf variables may be split for all the q possible values of $\{0, 1, \alpha, \alpha^2, \dots, \alpha^{q-2}\}$ and a path metric may be computed for each of the splits. Then, the splits may be pruned. The computation of the splits, the path metric for each of the splits, and the pruning may involve complex hardware.

In the binary Polar SCL decoding at 416, a hardware tradeoff may include splitting the weakest amongst the parent node variables, which is identified with a calculation of the min (abs (LLR)). For example, hard decisions may be made for the other nodes, e.g., that are not determined to be the weakest node. Then, the path metric may be calculated for each of the possible values of the weakest node. For non-binary Polar SCL decoding, few figure of merits (FoMs) may be used to identify the weakest parent node variable. As show at 415, entropy may be used as an FoM to find a weakest parent node variable. For example, the weakest variable may be determined as the variable with the maximum entropy. For example, for a Rate-1 node with length $M=2^N$:

$$i_{Hmax} = \mathrm{argmax}(H(x_{i=0:M-1})) \tag{Equation 30}$$

where $i_{Hmax}$ is the weakest variable, e.g., the variable with the highest entropy. In SCL decoding, for example, q splits can happen on $x_{Hmax} \overset{def}{=} x_{i=i_{Hmax}}$ taking any of the "q" possible values $\{0, 1, \alpha, \alpha^2, \dots, \alpha^{q-2}\}$. Therefore, each split may have a separate computation of leaf symbol decisions ($\hat{U}$) in order to skip the tree traversal:

$$\hat{U}_{|x_{Hmax} = f_l} = \left(\hat{X}_{[x_0 = \widehat{x_0}, x_1 = \widehat{x_1}, \dots, x_{M-1} = \widehat{x_{M-1}}, x_{Hmax} = f_l]}\right). \tag{Equation 31}$$

$$\left(G^{\otimes N}\right)^{-1}, \text{ where } \forall f_l \in GF(q) \text{ and } G \text{ is the } \begin{bmatrix} a & 0 \\ c & b \end{bmatrix}$$

Similarly, a path metric may be computed for each of the "q" splits. The corresponding path metric penalty for each of "q" splits on $x_{Hmax}$ can be represented as:

$$PM_{U=\hat{U}_{|x_{Hmax}=f_l}} = PM_{[x_0 = \widehat{x_0}, x_1 = \widehat{x_1}, \dots, x_{M-1} = \widehat{x_{M-1}}, x_{Hmax}=f_l]} = $$
$$\sum_{\substack{i=0 \\ i \neq Hmax}}^{M-1} \left(\ln\left(\sum_{\forall k \in GF(q)} e^{L x_i(k)}\right) - L_{x_i}(\hat{x}_i)\right) + $$
$$\left(\left(\ln\left(\sum_{\forall k \in GF(q)} e^{L x_{Hmax}(k)}\right) - L_{x_{Hmax}}(f_l)\right)\right), \tag{Equation 32}$$
$$\text{where } \forall f_l \in GF(q)$$

The path metric for each of the q splits can be approximated using an approximated PM equation, e.g., as described in connection with equation 11. There may be no path metric penalty for each of the hard decisions which correlate with $L_{x_i}(f_i)$. For example, the path metric may be calculated as:

$$PM_{U=\hat{U}_{|x_{Hmax}=f_l}} = PM_{[x_0 = \widehat{x_0}, x_1 = \widehat{x_1}, x_{M-1} = \widehat{x_{M-1}}, x_{Hmax}=f_l]} \cong $$
$$\sum_{\substack{i=0 \\ i \neq Hmax}}^{M-1} + \left(\left(\ln\left(\sum_{\forall k \in GF(q)} e^{L x_{Hmax}(k)}\right) - L_{x_{Hmax}}(f_l)\right)\right) = \cong $$
$$\mathrm{Max}\left(0, L_{x_{Hmax}}(1), L_{x_{Hmax}}(\alpha),\right.$$
$$\left. L_{x_{Hmax}}(\alpha^2), \dots, L_{x_{Hmax}}(\alpha^{q-2})\right) - L_{x_{Hmax}}(f_l),$$
$$\text{where } \forall f_l \in GF(q) \tag{Equation 33}$$

The strikethrough portion of the equation indicates that the value of that portion is zero. Therefore, for Rate-1 nodes, the GF(q) Polar SC List decoder (e.g., decoder 403 at the receiver 402) may include the split based on the less reliable node and a computation of the associated path metric. For example, the path metric computation may be simplified using a maximum approximation. The less reliable node may be identified, or determined, based on having the largest entropy.

WREP Nodes

Figure 10:
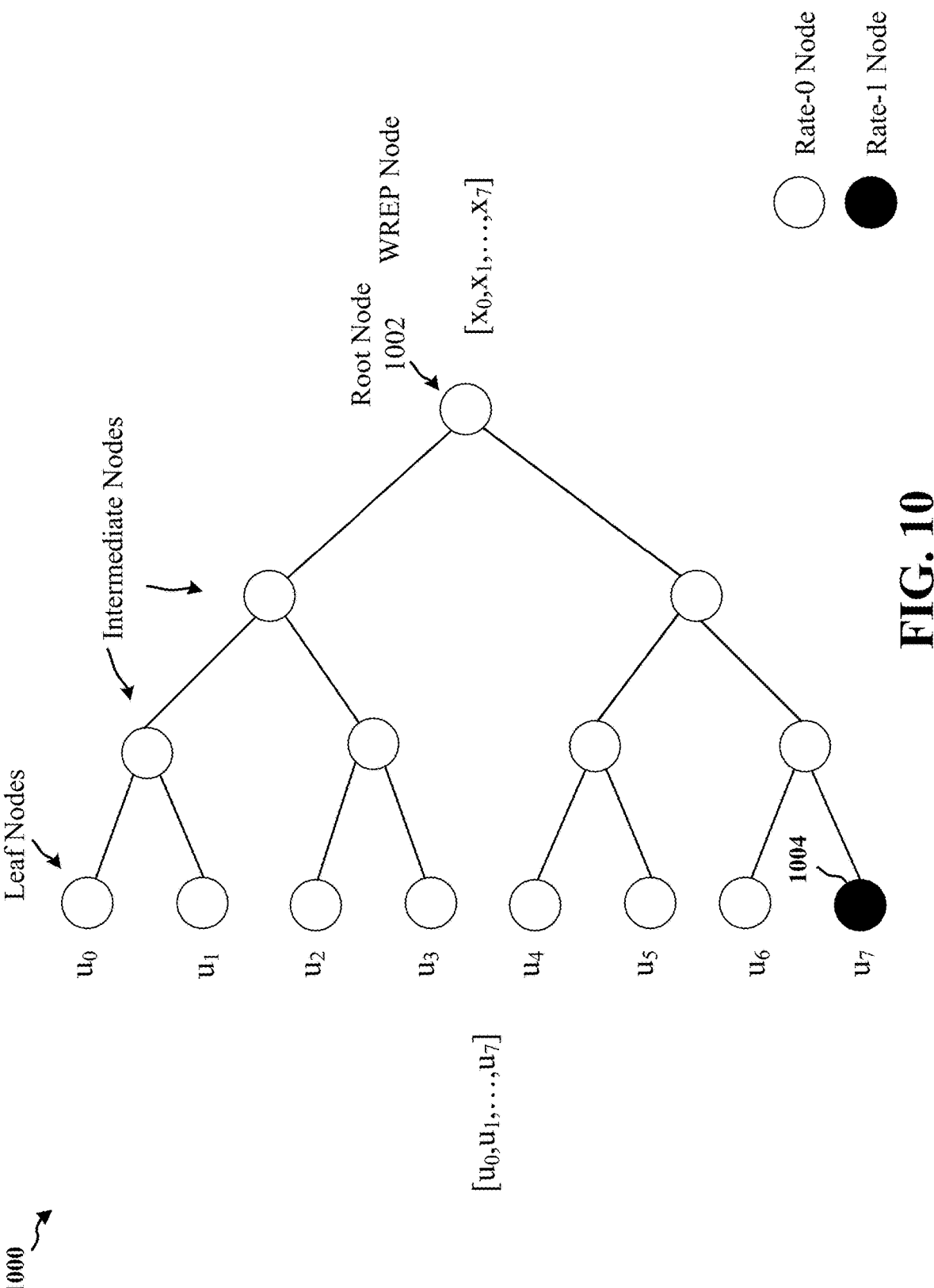
FIG. 10 illustrates an example of a WREP node 1002, in accordance with various aspects of the present disclosure.

Weighted repetition (WREP) nodes correspond to parent (or root) nodes that include child leaf nodes that correspond to frozen (or known) symbols except for a bottom leaf node, which is an information symbol. FIG. 10 illustrates an example diagram 1000 of a WREP node 1002 with a length 8. Each of the child leaf nodes (e.g., for $u_0$-$u_6$) for the WREP node 1002 are for known or frozen symbols except for the child leaf node 1004 ($u_7$) that is an information symbol.

For example, a weighted repetition (WREP) parent node with length $M=2^N$ has leaf nodes which are frozen except the bottom one which is an info symbol ([$u_{0, 1} \dots, M-2=0$, $u_{M-1}$=info symbol]).

Therefore, using the polar code function $X=U \otimes G^{*N}$, the following system of equations can be used to represent a different weighted repetition of the single information symbol, where r corresponds to a weight.

$$\begin{cases} x_0 = r_{M,x_0} \otimes u_{M-1} \\ \dots \\ x_{M-1} = r_{M,x_{M-1}} \otimes u_{M-1} \end{cases} \quad \text{(Equation 34)}$$

where $r_{M,x_i} \in GF(q)$ and is dependent on the length of node $M$

In an SC decoding algorithm, the probability of this single info symbol ($u_{M-1}$) can be computed as:

$$PMF_{u_{M-1}}(f_l) = \prod_{i=0}^{M-1} PMF_{x_i}(r_{M,x_i} \otimes f_l) \quad \text{(Equation 35)}$$

$$L_{u_{M-1}}(f_l) = \sum_{i=0}^{M-1} L_{x_i}(r_{M,x_i} \otimes f_l) \quad \text{(Equation 36)}$$

$$\widehat{u_{M-1}} = \text{argmax}(L_{u_{M-1}}(f_l)), \forall f_l \in GF(q) \quad \text{(Equation 37)}$$

Equation 36 shows the weighted value, r, in the relationship between a logarithmic normalized probability value of the child node for the information symbol and the logarithmic normalized probability value of the parent node. In SCL decoding, the single information leaf node ($u_{M-1}$) splits by taking any of the "q" possible values of $\{0, 1, \alpha, \alpha^2, \dots, \alpha^{q-2}\}$ can be represented as:

$$\hat{U}_{|\widehat{u_{M-1}}=f_l} = [0, 0, \dots, f_l], \text{ where } \forall f_l \in GF(q) \quad \text{(Equation 38)}$$

The corresponding PM for each split can be computed as:

$$PM_{U=\hat{U}_{|u_{M-1}=f_l}} = PM_{X=\hat{X}_{|x_i=r_{M,x_i}\otimes f_l}} = \quad \text{(Equation 39)}$$

$$\sum_{i=0}^{M-1} \left( \ln\left( \sum_{\forall k\in GF(4)} e^{L_{x_i}(k)} \right) - L_{x_i}(r_{M,x_i} \otimes f_l) \right),$$

where $\forall f_l \in GF(q)$

This can be approximated as:

$$PM_{U=\hat{U}_{|u_{M-1}=f_l}} = \quad \text{(Equation 40)}$$

$$PM_{X=\hat{X}_{|x_i=r_{M,x_i}\otimes f_l}} \cong \sum_{i=0}^{M-1} \big( \text{Max}\big(0, L_{x_i}(1), L_{x_i}(\alpha),$$

$$L_{x_i}(\alpha^2), \dots, L_{x_i}(\alpha^{q-2})\big) - L_{x_i}(r_{M,x_i} \otimes f_l) \big),$$

where $\forall f_l \in GF(q)$

Thus, for a WREP node, the decoder 403 may apply a formulation for GF(q) Polar SC decoder, e.g., as described in connection with equations 35-37. For example, in which a logarithmic normalized probability value for a parent node is based on a weighted logarithmic normalized probability value for the single node corresponding to the information symbol. For SCL decoding for a WREP node, the decoder may perform a simplified PM computation using a maximum approximation of logarithmic normalized values for random variable probabilities, e.g., as described in connection with equation 40, for example.

SPC Nodes

Figure 11:
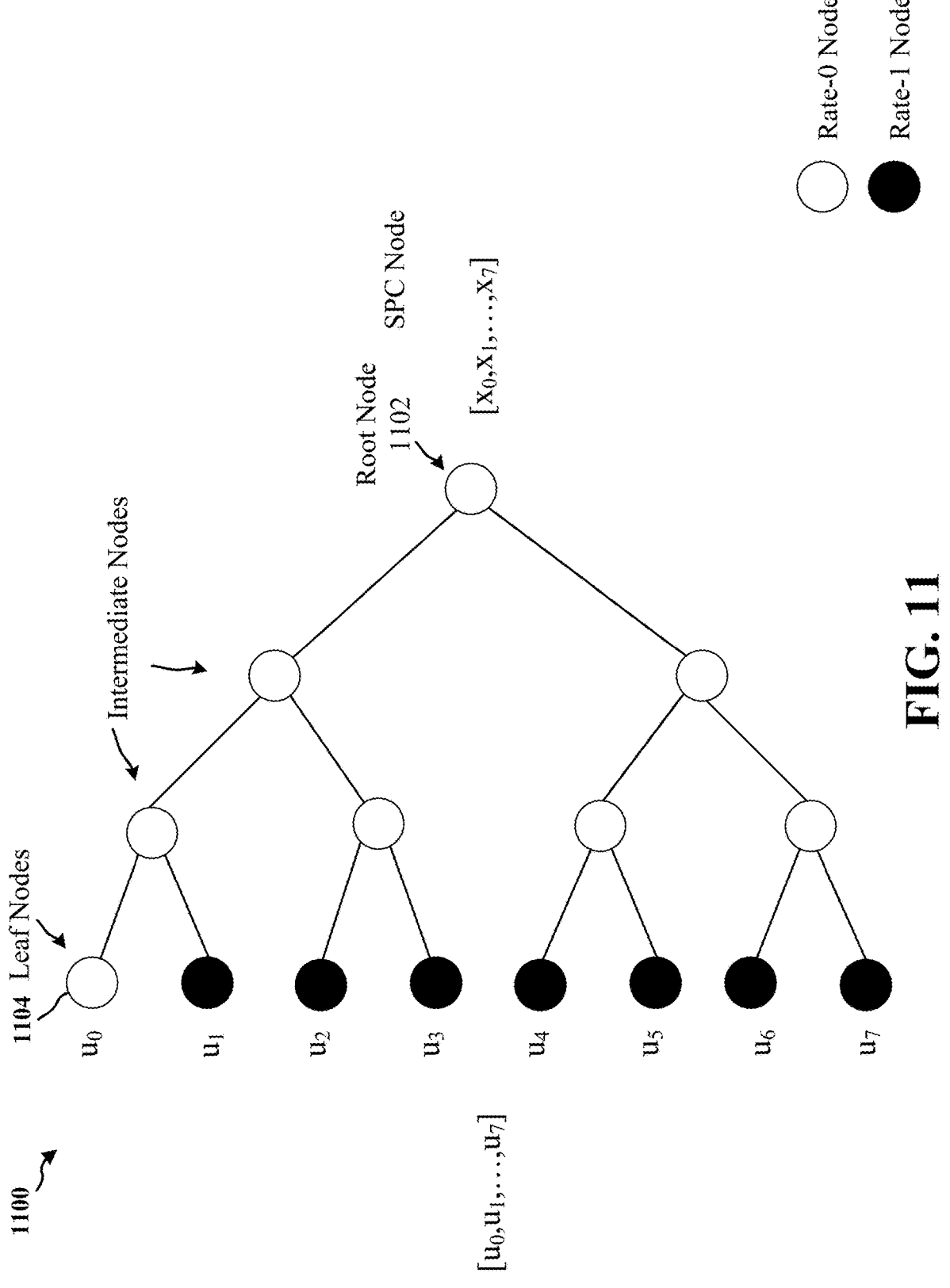
FIG. 11 illustrates an example of an SPC node, in accordance with various aspects of the present disclosure.

An SPC node has leaf nodes that are information symbols except for a top leaf node that is a frozen (e.g. zero) symbol. FIG. 11 illustrates an example 1100 of an SPC node. For example, root node 1102 is an SPC node having a length of 8, and each of the child leaf nodes (e.g., for $u_1$-$u_7$) are for information symbols except for the leaf node ($u_0$) 1104, which is a frozen/known symbol (e.g., zero). As an example, an SPC parent node with a length $M=2^N$ has leaf nodes which are info symbols except the top one which is a frozen (zero) symbol ($[u_{1, 1}, \dots, {}_{M-1}=$info symbol, $u_0=0]$). Therefore, using the Polar coding function, $U=X\otimes(G*^N)^{-1}$, the following equation shows that $u_0$ is a summation of the values at the parent node, which sums to zero:

$$u_0 = \sum_{\oplus i=0}^{M-1} s_{M,x_i} \otimes x_i = 0, \quad \text{(Equation 41)}$$

where $s_{M,x_i} \in GF(q)$ and is dependent on the length of node $M$

In an SCL decoder, the decoding for the SPC node (e.g., a best effort for the SPC node) may include splitting each information symbol leaf variable for all the "q" possible values of $\{0, 1, \alpha, \alpha^2, \dots, \alpha^{q-2}\}$ and computing the PM for the splits and then pruning the calculated PMs, but this may involve complex hardware.

To reduce the computation efforts, aspects presented herein propose to split on a number (>1) of the "weakest" variables of the parent node ($x_i$), while the chosen values for these variables also satisfies the single parity equation in equation 44.

The following shows example equations for the split on two weakest parent node variables to illustrate the concept. The concept may be similarly applied for a split for more than two weakest nodes. Assuming there is an SPC node with length $M=2^N$, the following two weakest variables can be identified using their entropy values.

$$i_{Hmax} = \text{argmax}(H(x_{i=0:M-1})) \quad \text{(Equation 42)}$$

$$i_{Hmax2} = \text{argmax}(H(x_{i=0:M-1})\backslash H(x_{Hmax}))$$

To find the possible values which these two variables can take while satisfying the single parity equation, first the hard decision of all the parent node variables can be computed based on:

$$\hat{x}_i = \text{argmax}(L_{x_i}(f_l)), \text{ where } \forall f_l \in GF(q) \text{ and } i \in \{0: M-1\} \quad \text{(Equation 43)}$$

The initial value of the single parity equation can be computed using the above-mentioned hard decision as follows. This may or may not be equal zero.

$$p = \sum_{\oplus i=0}^{M-1} s_{M,x_i} \otimes \hat{x}_i \quad \text{(Equation 44)}$$

The two weakest parent node variables can be split and take the following values. These values result in the single parity equation to be equal zero. There are the following q splits.

Split 1: $x_{\widetilde{Hmax}} = \hat{x}_{Hmax} \oplus \left(s^{-1}_{M,x_{Hmax}} \otimes p\right), x_{\widetilde{Hmax2}} = \hat{x}_{Hmax2}$ (Equation 45)

Split 2: $x_{\widetilde{Hmax}} = \hat{x}_{Hmax} \oplus \left(s^{-1}_{M,x_{Hmax}} \otimes (p \oplus 1)\right),$ $x_{\widetilde{Hmax2}} = \hat{x}_{Hmax2} \oplus s^{-1}_{M,x_{Hmax2}}$ Split 3: $x_{\widetilde{Hmax}} = \hat{x}_{Hmax} \oplus \left(s^{-1}_{M,x_{Hmax}} \otimes (p \oplus \alpha)\right),$ $x_{\widetilde{Hmax2}} = \hat{x}_{i_{Hmax2}} \oplus \left(s^{-1}_{M,x_{Hmax2}} \otimes \alpha\right)$ Split 4: $x_{\widetilde{Hmax}} = \hat{x}_{Hmax} \oplus \left(s^{-1}_{M,x_{Hmax}} \otimes (p \oplus \alpha^2)\right),$ $x_{\widetilde{Hmax2}} = \hat{x}_{Hmax2} \oplus \left(s^{-1}_{M,x_{Hmax2}} \otimes \alpha^2\right)$

...

Split q: $x_{\widetilde{Hmax}} = \hat{x}_{Hmax} \oplus \left(s^{-1}_{M,x_{Hmax}} \otimes (p \oplus \alpha^{q-2})\right),$ $x_{\widetilde{Hmax2}} = \hat{x}_{Hmax2} \oplus \left(s^{-1}_{M,x_{Hmax2}} \otimes \alpha^{q-2}\right)$ For each of the q splits, the info symbols can be computed as:

$$\hat{U}\big|_{x_{Hmax}=x_{\widetilde{Hmax}},x_{Hmax2}=x_{\widetilde{Hmax2}}} = \quad \text{(Equation 46)}$$

$$\left(\hat{X}\big|_{x_{Hmax}=x_{\widetilde{Hmax}},x_{Hmax2}=x_{\widetilde{Hmax2}}}\right).\left(G^{\otimes N}\right)^{-1},$$

$$\text{where } G \text{ is the } \begin{bmatrix} a & 0 \\ c & b \end{bmatrix}$$

For each of the q splits, the PM penalty can be computed as:

$$PM_{U=\hat{U}}\big|_{x_{Hmax}=x_{\widetilde{Hmax}},x_{Hmax2}=x_{\widetilde{Hmax2}}} = \quad \text{(Equation 47)}$$

$$PM_{[x_0=\hat{x}_0,x_1=\hat{x}_1,\cdots,x_{M-1}=\hat{x}_{M-1},x_{Hmax}=x_{\widetilde{Hmax}},x_{Hmax2}=x_{\widetilde{Hmax2}}]}$$

$$= \sum_{i=0\backslash\{x_{Hmax},x_{Hmax2}\}}^{M-1} \left(\ln\left(\sum_{\forall k \in GF(q)} e^{L_{x_i}(k)}\right) - L_{x_i}(\hat{x}_i)\right) +$$

$$\left(\ln\left(\sum_{\forall k \in GF(q)} e^{L_{x_{i_{Hmax}}}(k)}\right) - L_{x_i}(x_{\widetilde{i_{Hmax}}})\right) +$$

$$\left(\ln\left(\sum_{\forall k \in GF(q)} e^{L_{x_{i_{Hmax2}}}(k)}\right) - L_{x_i}(x_{\widetilde{i_{Hmax2}}})\right)$$

This can be approximated as:

$$PM_{U=\hat{U}}\big|_{x_{Hmax}=x_{\widetilde{Hmax}},x_{Hmax2}=x_{\widetilde{Hmax2}}} = \quad \text{(Equation 48)}$$

$$PM_{[x_0=\hat{x}_0,x_1=\hat{x}_1,\cdots,x_{M-1}=\hat{x}_{M-1},x_{Hamx}=x_{\widetilde{Hmax}},x_{Hmax2}=x_{\widetilde{Hmax2}}]}$$

$$\cong$$

$$\sum_{i=0\backslash\{x_{Hmax},x_{Hmax2}\}} + \left(\text{Max}\left(0, L_{x_{Hmax}}(1), L_{x_{Hmax}}(\alpha), L_{x_{Hmax}}(\alpha^2),\right.\right.$$

$$\left. \ldots, L_{x_{Hmax}}(\alpha^{q-2})\right) + \left(\text{Max}\left(0, L_{x_{i_{Hmax2}}}(1), L_{x_{i_{Hmax2}}}(\alpha),\right.\right.$$

-continued $$L_{x_{i_{Hmax2}}}(\alpha^2), \ldots, L_{x_{i_{Hmax2}}}(\alpha^{q-2})\right) - L_{x_{i_{Hmax2}}}(x_{\widetilde{i_{Hmax2}}})\right)$$

The strikethrough portion of the equation indicates that the value of that portion is zero. Thus, SPC node formulation for GF(q) Polar SC List decoder (e.g., decoder 403) can use a split based on the less reliable nodes and a corresponding computation of the PM. The PM computation may be simplified using a maximum approximation based on logarithmic normalized values for random variable probabilities, as shown. The less reliable nodes, for which the split is performed, may be identified based on a largest entropy, for example.

Figure 12:
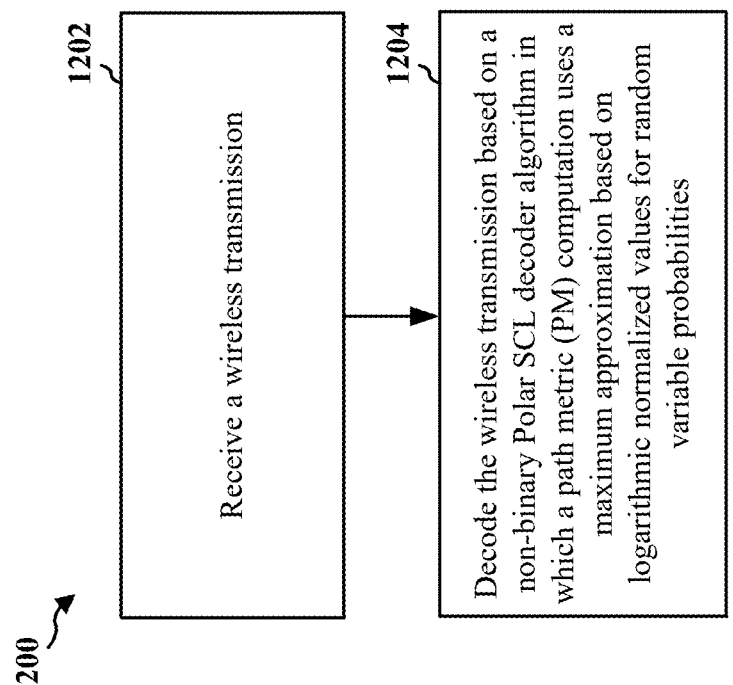
FIG. 12 is a flowchart of a method of wireless communication at a receiver, in accordance with various aspects of the present disclosure.

FIG. 12 is a flowchart 1200 of a method of wireless communication at a receiver (e.g., receiver 402). In some aspects, the method may be performed by a UE (e.g., the UE 104, 350; the apparatus 1304). In some aspects, the method may be performed by a network node such as a base station, or one or more components of a base station, (e.g., the base station 102, 310; the CU 110; the DU 130; the RU 140; the network entity 1402). The method enables a reduction in decoder complexity, and enables more cost efficient receivers to be used in wireless communication.

At 1202, the wireless device receives a wireless transmission. The wireless transmission may include a non-binary Polar encoded transmission in which each received symbol corresponds to multiple bits of information. FIG. 4 illustrates an example of a receiver 402 receiving an encoded transmission 414. The reception may be performed, e.g., by the non-binary Polar decoder component 198, the transceiver 1322, and/or the antenna 1380 of the apparatus in FIG. 13, in some aspects. In some aspects, the reception may be performed, e.g., by the non-binary Polar decoder component 199, the transceiver 1446, and/or the antenna 1480 of the network entity 1402 in FIG. 14.

At 1204, the wireless device decodes the wireless transmission based on a non-binary polar successive cancellation list (SCL) decoder algorithm in which a path metric (PM) computation uses a maximum approximation based on logarithmic normalized values for random variable probabilities. FIG. 4 illustrates an example of a receiver decoding the non-binary Polar encoded transmission using various aspects based on SCL. As illustrated at 415, various aspects may be employed to reduce complexity in the processing at the receiver in order to decode the transmission. The decoding may be performed, e.g., by the non-binary Polar decoder component 198 of the apparatus in FIG. 13 or the non-binary Polar decoder component 199 of the network entity 1402, for example. FIGS. 5-11 illustrate additional example aspects of non-binary Polar decoding based on SC and/or SCL.

In some aspects, the decoding of the wireless transmission may be based on a tree traversal algorithm having multiple nodes, including at least one Rate-0 parent node for which child node values correspond to known symbols and a corresponding computation of a path metric at the Rate-0 parent node. In some aspects, for the Rate-0 parent node, the decoding may include determining the path metric at a parent node based on the maximum approximation of the logarithmic normalized values for the random variable probabilities. Examples aspects of a Rate-0 node and the corresponding decoding process are described in connection with FIG. 8.

In some aspects, the decoding of the wireless transmission may be based on a tree traversal algorithm having multiple nodes, including at least one Rate-1 parent node for which child node values correspond to information symbols. A split may be performed based on one or more less reliable nodes of the multiple nodes and hard decisions are performed for other child node values of the Rate-1 parent node, and a corresponding computation may be determined for a path metric at the Rate-1 parent node. The other child node values refer to child nodes other than the one or more less reliable nodes. In some aspects, the corresponding computation of the path metric may be based on the maximum approximation of the logarithmic normalized values for the random variable probabilities for the one or more less reliable nodes. In some aspects, the wireless device may identify the one or more less reliable nodes from a set of nodes based on a largest entropy among the set of nodes. Examples aspects of a Rate-1 node and the corresponding decoding process are described in connection with FIG. 9.

In some aspects, the decoding of the wireless transmission may be based on a tree traversal algorithm having multiple nodes, including at least one WREP parent node having child nodes corresponding to known symbols except for a single node corresponding to an information symbol, and a corresponding computation of a path metric at the WREP parent node. In some aspects, for the WREP parent node, the decoding may include determining the path metric at the WREP parent node based on the maximum approximation of the logarithmic normalized values for the random variable probabilities. Examples aspects of a WREP node and the corresponding decoding process are described in connection with FIG. 10.

In some aspects, the decoding of the wireless transmission may be based on a tree traversal algorithm having multiple nodes, including at least one SPC parent node for which a child node value corresponds to a known symbol and other child node values correspond to information symbols. A split may be performed based on one or more less reliable nodes and hard decisions are performed for the other child node values of the SPC parent node, and a corresponding computation may be determined for a path metric at the SPC parent node. The other child node values refer to child nodes other than the one or more less reliable nodes. For example, the corresponding computation of the path metric for the SPC node may be based on the maximum approximation of the logarithmic normalized values for the random variable probabilities. In some aspects, the wireless device may identify the one or more less reliable nodes from a set of nodes based on a largest entropy among the set of nodes. Examples aspects of an SPC node and the corresponding decoding process are described in connection with FIG. 11.

Figure 13:
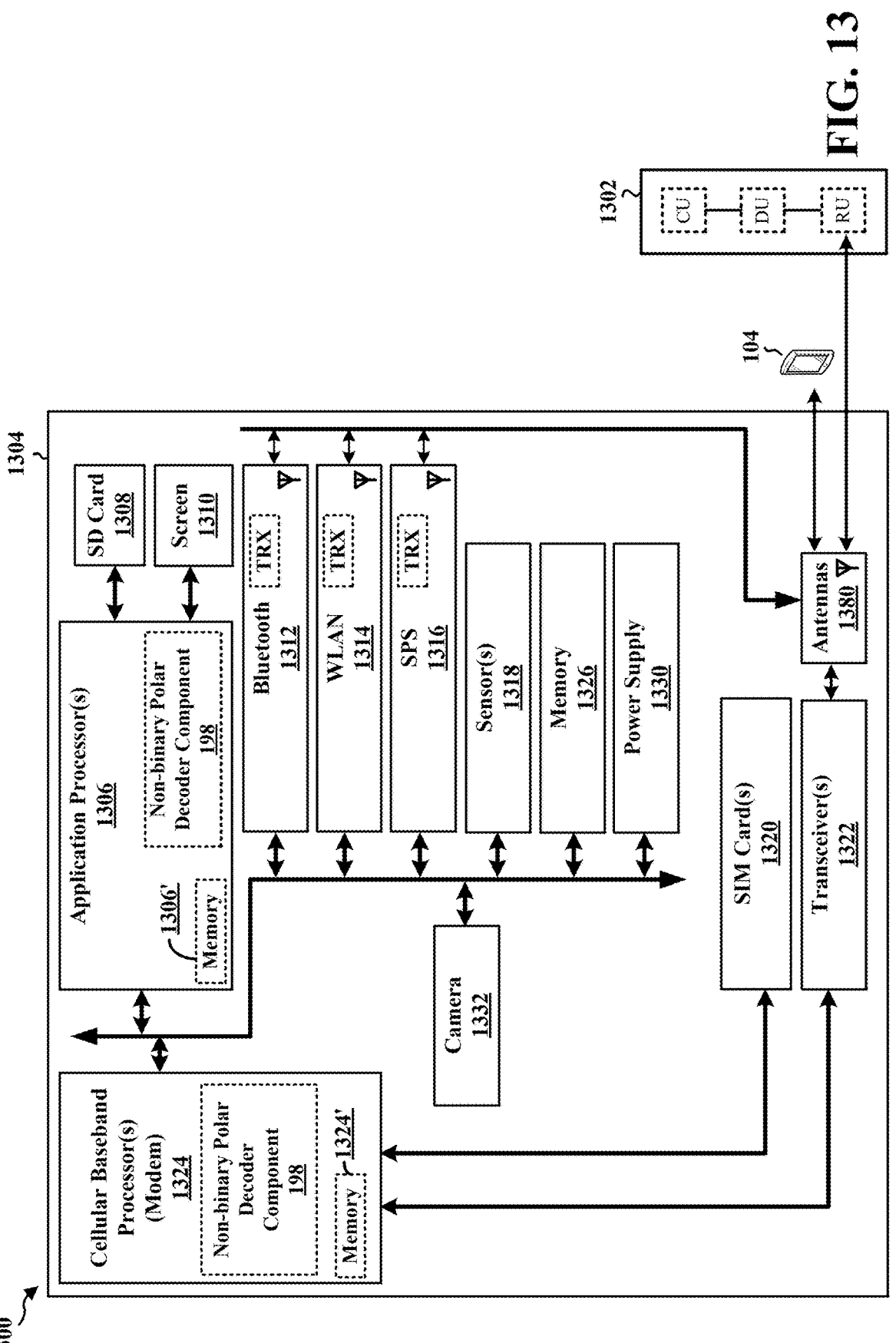
FIG. 13 is a diagram illustrating an example of a hardware implementation for an example apparatus and/or network entity, in accordance with various aspects of the present disclosure.

FIG. 13 is a diagram 1300 illustrating an example of a hardware implementation for an apparatus 1304. In some aspects, the apparatus may correspond to the receiver 402 and/or may be configured to perform the non-binary Polar decoding described in connection with the flowchart in FIG. 12. The apparatus 1304 may be a UE, a component of a UE, or may implement UE functionality. In some aspects, the apparatus 1304 may include at least one cellular baseband processor 1324 (also referred to as a modem) coupled to one or more transceivers 1322 (e.g., cellular RF transceiver). The cellular baseband processor(s) 1324 may include at least one on-chip memory 1324'. In some aspects, the apparatus 1304 may further include one or more subscriber identity modules (SIM) cards 1320 and at least one application processor 1306 coupled to a secure digital (SD) card 1308 and a screen 1310. The application processor(s) 1306 may include on-chip memory 1306'. In some aspects, the apparatus 1304 may further include a Bluetooth module 1312, a WLAN module 1314, an SPS module 1316 (e.g., GNSS module), one or more sensor modules 1318 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1326, a power supply 1330, and/or a camera 1332. The Bluetooth module 1312, the WLAN module 1314, and the SPS module 1316 may include an on-chip transceiver (TRX) (or in some cases, just a receiver (RX)). The Bluetooth module 1312, the WLAN module 1314, and the SPS module 1316 may include their own dedicated antennas and/or utilize the antennas 1380 for communication. The cellular baseband processor(s) 1324 communicates through the transceiver(s) 1322 via one or more antennas 1380 with the UE 104 and/or with an RU associated with a network entity 1302. The cellular baseband processor(s) 1324 and the application processor(s) 1306 may each include a computer-readable medium/memory 1324', 1306', respectively. The additional memory modules 1326 may also be considered a computer-readable medium/memory. Each computer-readable medium/memory 1324', 1306', 1326 may be non-transitory. The cellular baseband processor(s) 1324 and the application processor(s) 1306 are each responsible for general processing, including the execution of software stored on the computer-readable medium/memory. The software, when executed by the cellular baseband processor(s) 1324/ application processor(s) 1306, causes the cellular baseband processor(s) 1324/application processor(s) 1306 to perform the various functions described supra. The cellular baseband processor(s) 1324 and the application processor(s) 1306 are configured to perform the various functions described supra based at least in part of the information stored in the memory. That is, the cellular baseband processor(s) 1324 and the application processor(s) 1306 may be configured to perform a first subset of the various functions described supra without information stored in the memory and may be configured to perform a second subset of the various functions described supra based on the information stored in the memory. The computer-readable medium/memory may also be used for storing data that is manipulated by the cellular baseband processor(s) 1324/application processor(s) 1306 when executing software. The cellular baseband processor(s) 1324/application processor(s) 1306 may be a component of the UE 350 and may include the at least one memory 360 and/or at least one of the TX processor 368, the RX processor 356, and the controller/processor 359. In one configuration, the apparatus 1304 may be at least one processor chip (modem and/or application) and include just the cellular baseband processor(s) 1324 and/or the application processor(s) 1306, and in another configuration, the apparatus 1304 may be the entire UE (e.g., see UE 350 of FIG. 3) and include the additional modules of the apparatus 1304.

As discussed supra, the non-binary Polar decoder component 198 may be configured to receive a wireless transmission and decode the wireless transmission based on a non-binary polar SCL decoder algorithm in which a PM computation uses a maximum approximation based on logarithmic normalized values for random variable probabilities. The non-binary Polar decoder component 198 may be further configured to identify the one or more less reliable nodes from a set of nodes based on a largest entropy among the set of nodes. The non-binary Polar decoder component 198 may be further configured to perform any of the aspects performed by the receiver 402 in FIG. 4 and/or described in connection with the flowchart in FIG. 12. The non-binary Polar decoder component 198 may be within the cellular baseband processor(s) 1324, the application processor(s) 1306, or both the cellular baseband processor(s) 1324 and the application processor(s) 1306. The non-binary Polar decoder component 198 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. As shown, the apparatus 1304 may include a variety of components configured for various functions. In one configuration, the apparatus 1304, and in particular the cellular baseband processor(s) 1324 and/or the application processor(s) 1306, may include means for receiving a wireless transmission and means for decoding the wireless transmission based on a non-binary polar SCL decoder algorithm in which a PM computation uses a maximum approximation based on logarithmic normalized values for random variable probabilities. The apparatus 1304 may further include means for identifying the one or more less reliable nodes from a set of nodes based on a largest entropy among the set of nodes. The apparatus 1304 may further include means for performing any of the aspects performed by the receiver 402 in FIG. 4 and/or described in connection with the flowchart in FIG. 12. The means may be the non-binary Polar decoder component 198 of the apparatus 1304 configured to perform the functions recited by the means. As described supra, the apparatus 1304 may include the TX processor 368, the RX processor 356, and the controller/processor 359. As such, in one configuration, the means may be the TX processor 368, the RX processor 356, and/or the controller/processor 359 configured to perform the functions recited by the means.

Figure 14:
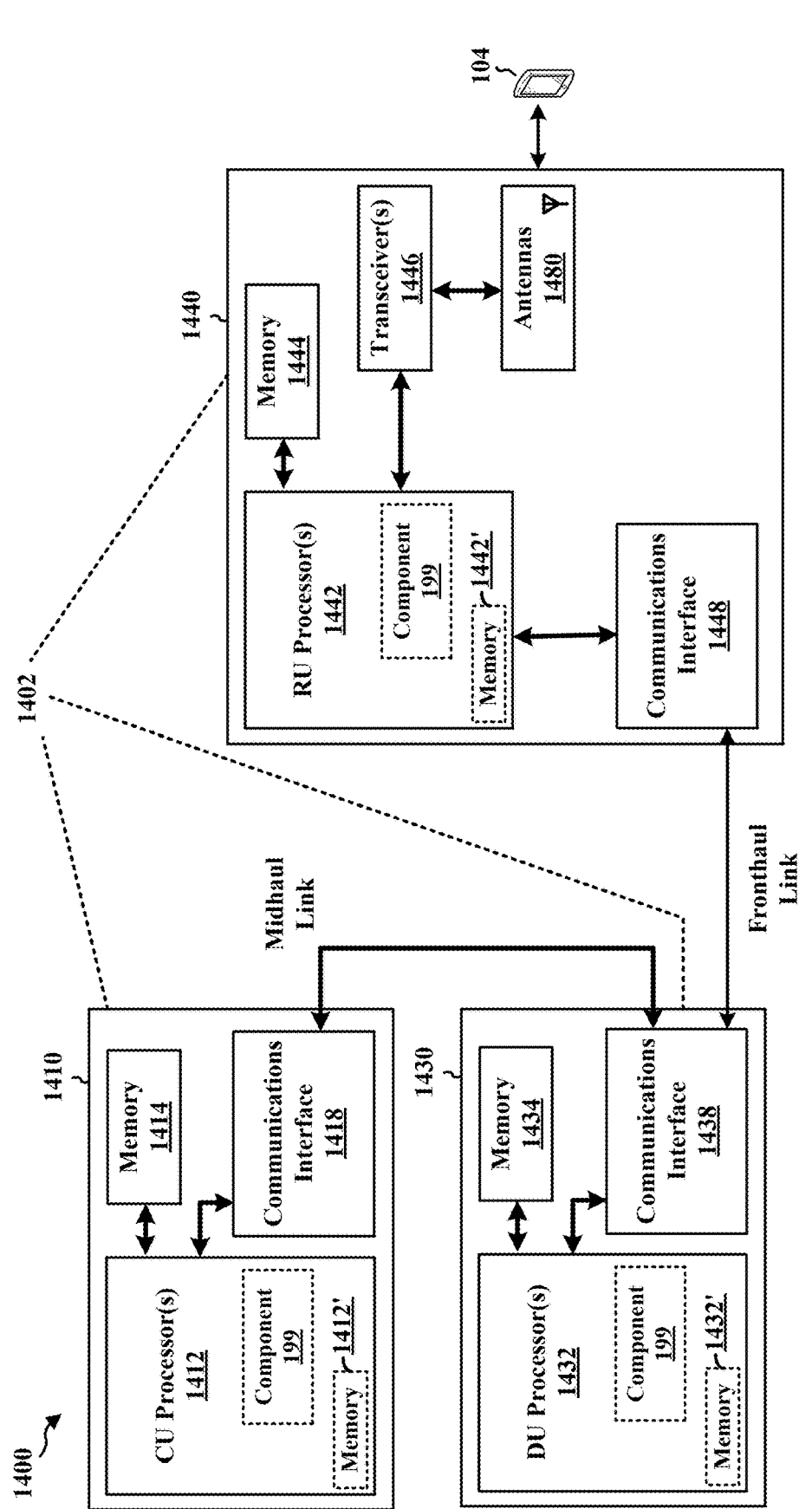
FIG. 14 is a diagram illustrating an example of a hardware implementation for an example network entity, in accordance with various aspects of the present disclosure.

FIG. 14 is a diagram 1400 illustrating an example of a hardware implementation for a network entity 1402. In some aspects, the network entity may correspond to the receiver 402 and/or may be configured to perform the non-binary Polar decoding described in connection with the flowchart in FIG. 12. The network entity 1402 may be a BS, a component of a BS, or may implement BS functionality. The network entity 1402 may include at least one of a CU 1410, a DU 1430, or an RU 1440. For example, depending on the layer functionality handled by the non-binary Polar decoder component 199, the network entity 1402 may include the CU 1410; both the CU 1410 and the DU 1430; each of the CU 1410, the DU 1430, and the RU 1440; the DU 1430; both the DU 1430 and the RU 1440; or the RU 1440. The CU 1410 may include at least one CU processor 1412. The CU processor(s) 1412 may include on-chip memory 1412'. In some aspects, the CU 1410 may further include additional memory modules 1414 and a communications interface 1418. The CU 1410 communicates with the DU 1430 through a midhaul link, such as an F1 interface. The DU 1430 may include at least one DU processor 1432. The DU processor(s) 1432 may include on-chip memory 1432'. In some aspects, the DU 1430 may further include additional memory modules 1434 and a communications interface 1438. The DU 1430 communicates with the RU 1440 through a fronthaul link. The RU 1440 may include at least one RU processor 1442. The RU processor(s) 1442 may include on-chip memory 1442'. In some aspects, the RU 1440 may further include additional memory modules 1444, one or more transceivers 1446, antennas 1480, and a communications interface 1448. The RU 1440 communicates with the UE 104. The on-chip memory 1412', 1432', 1442' and the additional memory modules 1414, 1434, 1444 may each be considered a computer-readable medium/memory. Each computer-readable medium/memory may be non-transitory. Each of the processors 1412, 1432, 1442 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the non-binary Polar decoder component 199 may be configured to receive a wireless transmission and decode the wireless transmission based on a non-binary polar SCL decoder algorithm in which a PM computation uses a maximum approximation based on logarithmic normalized values for random variable probabilities. The network entity may be further configured to identify the one or more less reliable nodes from a set of nodes based on a largest entropy among the set of nodes. The network entity 1402 may be further configured to perform any of the aspects performed by the receiver 402 in FIG. 4 and/or described in connection with the flowchart in FIG. 12. The non-binary Polar decoder component 199 may be within one or more processors of one or more of the CU 1410, DU 1430, and the RU 1440. The non-binary Polar decoder component 199 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. The network entity 1402 may include a variety of components configured for various functions. In one configuration, the network entity 1402 may include means for receiving a wireless transmission and means for decoding the wireless transmission based on a non-binary polar SCL decoder algorithm in which a PM computation uses a maximum approximation based on logarithmic normalized values for random variable probabilities. The network entity 1402 may further include means for identifying the one or more less reliable nodes from a set of nodes based on a largest entropy among the set of nodes. The network entity 1402 may further include means for performing any of the aspects performed by the receiver 402 in FIG. 4 and/or described in connection with the flowchart in FIG. 12. The means may be the non-binary Polar decoder component 199 of the network entity 1402 configured to perform the functions recited by the means. As described supra, the network entity 1402 may include the TX processor 316, the RX processor 370, and the controller/processor 375. As such, in one configuration, the means may be the TX processor 316, the RX processor 370, and/or the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. When at least one processor is configured to perform a set of functions, the at least one processor, individually or in any combination, is configured to perform the set of functions. Accordingly, each processor of the at least one processor may be configured to perform a particular subset of the set of functions, where the subset is the full set, a proper subset of the set, or an empty subset of the set. A processor may be referred to as processor circuitry. A memory/memory module may be referred to as memory circuitry. If a first apparatus receives data from or transmits data to a second apparatus, the data may be received/transmitted directly between the first and second apparatuses, or indirectly between the first and second apparatuses through a set of apparatuses. A device configured to "output" data or "provide" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data. Information stored in a memory includes instructions and/or data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device,"

and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication, including: receiving a wireless transmission; and decoding the wireless transmission based on a non-binary polar successive cancellation list (SCL) decoder algorithm in which a path metric (PM) computation uses a maximum approximation based on logarithmic normalized values for random variable probabilities.

In aspect 2, the method of aspect 1 further includes that the decoding of the wireless transmission is based on a tree traversal algorithm having multiple nodes, including at least one Rate-0 parent node for which child node values correspond to known symbols and a corresponding computation of a path metric at the Rate-0 parent node.

In aspect 3, the method of aspect 2 further includes that for the Rate-0 parent node, the decoding includes determining the path metric at a parent node based on the maximum approximation of the logarithmic normalized values for the random variable probabilities.

In aspect 4, the method of any of aspects 1-3 further includes that the decoding of the wireless transmission is based on a tree traversal algorithm having multiple nodes, including at least one Rate-1 parent node for which child node values correspond to information symbols, wherein a split is performed based on one or more less reliable nodes of the multiple nodes and hard decisions are performed for other child node values of the Rate-1 parent node, and a corresponding computation of a path metric at the Rate-1 parent node.

In aspect 5, the method of aspect 4 further includes that the corresponding computation of the path metric is based on the maximum approximation of the logarithmic normalized values for the random variable probabilities for the one or more less reliable nodes.

In aspect 6, the method of aspect 4 or aspect 5 further includes identifying the one or more less reliable nodes from a set of nodes based on a largest entropy among the set of nodes.

In aspect 7, the method of any of aspects 1-6 further includes that the decoding of the wireless transmission is based on a tree traversal algorithm having multiple nodes, including at least one weighted repetition (WREP) parent node having child nodes corresponding to known symbols except for a single node corresponding to an information symbol, and a corresponding computation of a path metric at the WREP parent node.

In aspect 8, the method of aspect 7 further includes that for the WREP parent node, the decoding includes determining the path metric at the WREP parent node based on the maximum approximation of the logarithmic normalized values for the random variable probabilities.

In aspect 9, the method of any of aspects 1-8 further includes that the decoding of the wireless transmission is based on a tree traversal algorithm having multiple nodes, including at least one single parity check (SPC) parent node for which a child node value corresponds to a known symbol and other child node values correspond to information symbols, and wherein a split is performed based on one or more less reliable nodes and hard decisions are performed for the other child node values of the SPC parent node, and a corresponding computation of a path metric at the SPC parent node.

In aspect 10, the method of aspect 9 further includes that the corresponding computation of the path metric for the SPC parent node is based on the maximum approximation of the logarithmic normalized values for the random variable probabilities.

In aspect 11, the method of aspect 9 or 10 further includes identifying the one or more less reliable nodes from a set of nodes based on a largest entropy among the set of nodes.

Aspect 12 is an apparatus for wireless communication comprising: at least one memory; and at least one processor coupled to the at least one memory, the at least one processor, individually or in any combination, is configured to perform the method of any of aspects 1 to 11.

Aspect 13 is an apparatus for wireless communication at a wireless device comprising: at least one memory; and at least one processor coupled to the at least one memory, the at least one processor, individually or in any combination, is configured to cause the wireless device to perform the method of any of aspects 1 to 11.

Aspect 14 is an apparatus for wireless communication comprising: memory circuitry; and processor circuitry coupled to the memory circuitry, the processor circuitry is configured to cause the apparatus to perform the method of any of aspects 1 to 11.

Aspect 15 is an apparatus for wireless communication, comprising means for performing each step in the method of any of aspects 1 to 11.

Aspect 16 is the apparatus of any of aspects 12-15, further comprising a transceiver configured to receive or to transmit in association with the method of any of aspects 1 to 11.

Aspect 17 is a computer-readable medium (e.g., a non-transitory computer-readable medium) storing computer executable code at a wireless device, the code when executed by at least one processor causes the wireless device to perform the method of any of aspects 1 to 11.

What is claimed is:

1. An apparatus for wireless communication, comprising:
at least one memory; and
at least one processor coupled to the at least one memory and, based at least in part on information stored in the at least one memory, the at least one processor, individually or in any combination, is configured to:
receive a wireless transmission; and
decode the wireless transmission based on a non-binary polar successive cancellation list (SCL) decoder algorithm in which a path metric (PM) computation uses a maximum approximation based on logarithmic normalized values for random variable probabilities.

2. The apparatus of claim 1, wherein the at least one processor, individually or in any combination, is configured to decode the wireless transmission based on a tree traversal algorithm having multiple nodes, including at least one Rate-0 parent node for which child node values correspond to known symbols and a corresponding computation of a path metric at the at least one Rate-0 parent node.

3. The apparatus of claim 2, wherein to decode the wireless transmission for the at least one Rate-0 parent node, the at least one processor, individually or in any combination, is configured to determine the path metric at a parent node based on the maximum approximation of the logarithmic normalized values for the random variable probabilities.

4. The apparatus of claim 1, wherein the at least one processor, individually or in any combination, is configured to decode the wireless transmission based on a tree traversal algorithm having multiple nodes, including at least one Rate-1 parent node for which child node values correspond to information symbols, wherein a split is performed based on one or more less reliable nodes of the multiple nodes and hard decisions are performed for other child node values of the at least one Rate-1 parent node, and a corresponding computation of a path metric at the at least one Rate-1 parent node.

5. The apparatus of claim 4, wherein the corresponding computation of the path metric is based on the maximum approximation of the logarithmic normalized values for the random variable probabilities for the one or more less reliable nodes.

6. The apparatus of claim 4, wherein the at least one processor, individually or in any combination, is further configured to:
identify the one or more less reliable nodes from a set of nodes based on a largest entropy among the set of nodes.

7. The apparatus of claim 1, wherein the at least one processor, individually or in any combination, is configured to decode the wireless transmission based on a tree traversal algorithm having multiple nodes, including at least one weighted repetition (WREP) parent node having child nodes corresponding to known symbols except for a single node corresponding to an information symbol, and a corresponding computation of a path metric at the at least one WREP parent node.

8. The apparatus of claim 7, wherein to decode the wireless transmission for the at least one WREP parent node, the at least one processor, individually or in any combination, is configured to determine the path metric at the at least one WREP parent node based on the maximum approximation of the logarithmic normalized values for the random variable probabilities.

9. The apparatus of claim 1, wherein the at least one processor, individually or in any combination, is configured to decode the wireless transmission based on a tree traversal algorithm having multiple nodes, including at least one single parity check (SPC) parent node for which a child node value corresponds to a known symbol and other child node values correspond to information symbols, and wherein a split is performed based on one or more less reliable nodes and hard decisions are performed for the other child node values of at least one SPC parent node, and a corresponding computation of a path metric at the at least one SPC parent node.

10. The apparatus of claim 9, wherein the corresponding computation of the path metric for the at least one SPC parent node is based on the maximum approximation of the logarithmic normalized values for the random variable probabilities.

11. The apparatus of claim 9, wherein the at least one processor, individually or in any combination, is further configured to:
identify the one or more less reliable nodes from a set of nodes based on a largest entropy among the set of nodes.

12. The apparatus of claim 1, further comprising one or more transceivers coupled to the at least one processor, wherein the apparatus is configured to receive the wireless transmission via the one or more transceivers.

13. A method of wireless communication, including:
   receiving a wireless transmission; and
   decoding the wireless transmission based on a non-binary polar successive cancellation list (SCL) decoder algorithm in which a path metric (PM) computation uses a maximum approximation based on logarithmic normalized values for random variable probabilities.

14. The method of claim 13, wherein the decoding of the wireless transmission is based on a tree traversal algorithm having multiple nodes, including at least one Rate-0 parent node for which child node values correspond to known symbols and a corresponding computation of a path metric at the at least one Rate-0 parent node, wherein for the at least one Rate-0 parent node, the decoding includes determining the path metric at a parent node based on the maximum approximation of the logarithmic normalized values for the random variable probabilities.

15. The method of claim 13, wherein the decoding of the wireless transmission is based on a tree traversal algorithm having multiple nodes, including at least one Rate-1 parent node for which child node values correspond to information symbols, wherein a split is performed based on one or more less reliable nodes of the multiple nodes and hard decisions are performed for other child node values of the at least one Rate-1 parent node, and a corresponding computation of a path metric at the at least one Rate-1 parent node.

16. The method of claim 15, wherein the corresponding computation of the path metric is based on the maximum approximation of the logarithmic normalized values for the random variable probabilities for the one or more less reliable nodes, the method further comprising:
   identifying the one or more less reliable nodes from a set of nodes based on a largest entropy among the set of nodes.

17. The method of claim 13, wherein the decoding of the wireless transmission is based on a tree traversal algorithm having multiple nodes, including at least one weighted repetition (WREP) parent node having child nodes corresponding to known symbols except for a single node corresponding to an information symbol, and a corresponding computation of a path metric at the at least one WREP parent node, wherein for the at least one WREP parent node, the decoding includes determining the path metric at the at least one WREP parent node based on the maximum approximation of the logarithmic normalized values for the random variable probabilities.

18. The method of claim 13, wherein the decoding of the wireless transmission is based on a tree traversal algorithm having multiple nodes, including at least one single parity check (SPC) parent node for which a child node value corresponds to a known symbol and other child node values correspond to information symbols, and wherein a split is performed based on one or more less reliable nodes and hard decisions are performed for the other child node values of the at least one SPC parent node, and a corresponding computation of a path metric at the at least one SPC parent node.

19. The method of claim 18, wherein the corresponding computation of the path metric for the at least one SPC parent node is based on the maximum approximation of the logarithmic normalized values for the random variable probabilities, the method further comprising:
   identifying the one or more less reliable nodes from a set of nodes based on a largest entropy among the set of nodes.

20. A non-transitory computer-readable medium storing computer executable code for wireless communication, the code when executed by at least one processor causes the at least one processor to:
   receive a wireless transmission; and
   decode the wireless transmission based on a non-binary polar successive cancellation list (SCL) decoder algorithm in which a path metric (PM) computation uses a maximum approximation based on logarithmic normalized values for random variable probabilities.

* * * * *